United States Patent
Mimura et al.

(10) Patent No.: US 11,456,482 B2
(45) Date of Patent: *Sep. 27, 2022

(54) SOLID ELECTROLYTE COMPOSITION, BINDER PARTICLES, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, AND METHODS FOR MANUFACTURING SAME

(71) Applicant: FUJIFILM Corporation, Tokyo (JP)

(72) Inventors: Tomonori Mimura, Kanagawa (JP); Hiroaki Mochizuki, Kanagawa (JP); Masaomi Makino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,838

(22) Filed: Dec. 4, 2020

(65) Prior Publication Data

US 2021/0091409 A1    Mar. 25, 2021

Related U.S. Application Data

(60) Division of application No. 15/992,452, filed on May 30, 2018, now Pat. No. 10,892,515, which is a
(Continued)

(30) Foreign Application Priority Data

Dec. 11, 2015    (JP) ............... JP2015-241754

(51) Int. Cl.
*H01M 4/62* (2006.01)
*H01M 4/139* (2010.01)
(Continued)

(52) U.S. Cl.
CPC ........ *H01M 10/0562* (2013.01); *C01D 15/00* (2013.01); *C08L 33/02* (2013.01);
(Continued)

(58) Field of Classification Search
CPC .......... H01M 4/62; H01M 4/139; H01M 4/13; H01M 4/403; H01M 10/0526; H01M 10/052

See application file for complete search history.

(56) References Cited

U.S. PATENT DOCUMENTS

| 5,620,795 A | 4/1997 | Haak et al. |
| 2005/0079409 A1* | 4/2005 | Andelman .......... H01M 10/052 429/94 |

(Continued)

FOREIGN PATENT DOCUMENTS

| CN | 1190423 A | 8/1998 |
| JP | 2003-022841 A | 1/2003 |

(Continued)

OTHER PUBLICATIONS

Machine Translation of: KR 10-2013-0021209, Cheol et al., Mar. 5, 2013.*

(Continued)

*Primary Examiner* — Kenneth J Douyette
(74) *Attorney, Agent, or Firm* — Sughrue Mion, PLLC

(57) ABSTRACT

An all-solid state secondary battery including: a positive electrode active material layer; a solid electrolyte layer; and a negative electrode active material layer in this order. At least one of the positive electrode active material layer, the solid electrolyte layer, and the negative electrode active material layer is a layer including an inorganic solid electrolyte having conductivity for ions of metal elements belonging to Group I or II of the periodic table and binder particles which have an average particle diameter of 10 nm
(Continued)

or more and 50,000 nm or less and encompass an ion-conductive substance. The binder particles are formed of the ion-conductive substance and a polymer, and the ion-conductive substance is coated with the polymer having a mass ratio of 30% or more and 100% or less of the ion-conductive substance.

10 Claims, 1 Drawing Sheet

Related U.S. Application Data continuation of application No. PCT/JP2016/086822, filed on Dec. 9, 2016.

(51) Int. Cl.
| | | |
|---|---|---|
| H01M 4/13 | (2010.01) | |
| H01M 10/0562 | (2010.01) | |
| H01M 10/052 | (2010.01) | |
| H01B 1/06 | (2006.01) | |
| H01B 13/00 | (2006.01) | |
| H01M 10/0585 | (2010.01) | |
| C01D 15/00 | (2006.01) | |
| C08L 33/02 | (2006.01) | |
| C08L 33/24 | (2006.01) | |
| C08L 75/02 | (2006.01) | |
| C08L 75/04 | (2006.01) | |
| H01M 4/04 | (2006.01) | |
| H01M 4/133 | (2010.01) | |
| H01M 4/1393 | (2010.01) | |
| H01M 4/66 | (2006.01) | |
| H01M 10/0525 | (2010.01) | |
| H01M 10/058 | (2010.01) | |
| H01M 4/02 | (2006.01) | |

(52) U.S. Cl.
CPC ............... *C08L 33/24* (2013.01); *C08L 75/02* (2013.01); *C08L 75/04* (2013.01); *H01B 1/06* (2013.01); *H01B 13/00* (2013.01); *H01M 4/0404* (2013.01); *H01M 4/0457* (2013.01); *H01M 4/13* (2013.01); *H01M 4/133* (2013.01); *H01M 4/139* (2013.01); *H01M 4/1393* (2013.01); *H01M 4/62* (2013.01); *H01M 4/622* (2013.01); *H01M 4/662* (2013.01); *H01M 10/052* (2013.01); *H01M 10/058* (2013.01); *H01M 10/0525* (2013.01); *H01M 10/0585* (2013.01); *H01M 2004/027* (2013.01); *H01M 2004/028* (2013.01); *H01M 2300/0068* (2013.01); *H01M 2300/0082* (2013.01); *H01M 2300/0091* (2013.01); *Y02T 10/70* (2013.01)

(56) References Cited

U.S. PATENT DOCUMENTS

| | | | |
|---|---|---|---|
| 2009/0081553 A1 | 3/2009 | Kondo et al. | |
| 2014/0127579 A1 | 5/2014 | Yoshida et al. | |
| 2014/0193689 A1 | 7/2014 | Takami et al. | |
| 2015/0255788 A1* | 9/2015 | Yokouchi | H01M 4/485 429/163 |
| 2016/0204465 A1 | 7/2016 | Mimura et al. | |
| 2016/0359195 A1 | 12/2016 | Makino et al. | |
| 2016/0365604 A1 | 12/2016 | Mimura et al. | |
| 2017/0346075 A1 | 11/2017 | Mimura et al. | |

FOREIGN PATENT DOCUMENTS

| | | | |
|---|---|---|---|
| JP | 2003-142100 A | 5/2003 | |
| JP | 2004-186089 A | 7/2004 | |
| JP | 2005-5024 A | 1/2005 | |
| JP | 2009-80999 A | 4/2009 | |
| JP | 2010-33732 A | 2/2010 | |
| JP | 2010-033732 A | 2/2010 | |
| JP | 2010-192258 A | 9/2010 | |
| JP | 2012-243476 A | 12/2012 | |
| JP | 2013-8611 A | 1/2013 | |
| JP | 2015-088486 A | 5/2015 | |
| JP | 2015-159067 A | 9/2015 | |
| JP | 2015-167126 A | 9/2015 | |
| KR | 10-2013-0021209 A * | 3/2013 | |
| WO | 2012/173089 A1 | 12/2012 | |
| WO | 2015/129704 A1 | 9/2015 | |
| WO | 2016/132872 A1 | 8/2016 | |

OTHER PUBLICATIONS

Office Action dated Apr. 6, 2021 in corresponding Chinese Application No. 201680071169.3.
Communication dated Feb. 11, 2020, from the Korean Intellectual Property Office in application No. 10-2018-701884.
Written Opinion dated Mar. 7, 2017 from the International Searching Authority in counterpart application No. PCT/JP2016/086822.
Communication dated Jul. 23, 2020 from the Korean Intellectual Property Office in KR Application No. 10-2020-7012869.
Communication dated Aug. 14, 2019, issued by the Korean Intellectual Property Office in corresponding application No. 10-2018-7018844.
International Search Report for PCT/JP2016/086822 dated Mar. 7, 2017.
International Preliminary Report on Patentability dated Jun. 12, 2018 from the International Searching Authority in counterpart International Application No. PCT. JP2016/086822.
Communication dated Nov. 11, 2019 issued by the European Patent Office in counterpart application No. 16873141.2.
Communication dated Apr. 7, 2020, from the Korean Patent Office in application No. 10-2018-7018844.
Communication dated Aug. 13, 2018 from the European Patent Office in counterpart application No. 16873141.2.
Communication dated Jun. 12, 2020, issued by the European Patent Office in application No. 16 873 141.2.
Communication dated Nov. 26, 2019 from Japanese Patent Office in counterpart JP Application No. 2017-555177.
Communication dated Apr. 9, 2019 issued by the Japanese Patent Office in counterpart Japanese application No. 2017-555177.
Communication dated Jul. 29, 2020 from the State Intellectual Property Office of the P.R.C. in Application No. 201680071169.3.

* cited by examiner

SOLID ELECTROLYTE COMPOSITION, BINDER PARTICLES, SHEET FOR ALL-SOLID STATE SECONDARY BATTERY, ELECTRODE SHEET FOR ALL-SOLID STATE SECONDARY BATTERY, ALL-SOLID STATE SECONDARY BATTERY, AND METHODS FOR MANUFACTURING SAME

CROSS-REFERENCE TO RELATED APPLICATIONS

This application is a Rule 53(b) Divisional Application of U.S. application Ser. No. 15/992,452 filed May 30, 2018, now U.S. Pat. No. 10,892,515, which is a Continuation of PCT International Application No. PCT/JP2016/086822 filed Dec. 9, 2016, which claims priority under 35 U.S.C. § 119(a) from Japanese Patent Application No. 2015-241754 filed Dec. 11, 2015, the disclosures of which are incorporated herein by reference in their respective entireties.

BACKGROUND OF THE INVENTION

1. Field of the Invention

The present invention relates to a solid electrolyte composition, binder particles, a sheet for an all-solid state secondary battery, an electrode sheet for an all-solid state secondary battery, an all-solid state secondary battery, and methods for manufacturing the same.

2. Description of the Background Art

Lithium ion secondary batteries are storage batteries which have a negative electrode, a positive electrode, and an electrolyte sandwiched between the negative electrode and the positive electrode and which can be discharged and charged by lithium ions reciprocally migrating between both electrodes. In the related art, in lithium ion secondary batteries, organic electrolytic solutions have been used as electrolytes. However, organic electrolytic solutions are likely to cause liquid leakage, additionally, there is a concern that overcharging and over-discharging may cause short circuits and ignition in batteries, and there is a demand for further improving reliability and safety.

In such a circumstance, all-solid state secondary batteries in which an inorganic solid electrolyte is used instead of an organic electrolytic solution are attracting attention. In all-solid state secondary batteries, all of the negative electrode, the electrolyte, and the positive electrode are made of a solid, stability or reliability which is a problem of batteries in which an organic electrolytic solution is used can be significantly improved, and it becomes possible to extend the service lives of batteries. Furthermore, to all-solid state secondary batteries, it is possible to provide a structure in which electrodes and an electrolyte are disposed in series in a direct arrangement. Therefore, compared with secondary batteries in which an organic electrolytic solution is used, it becomes possible to increase the energy density, and the application to electrical vehicles, large-sized storage batteries, and the like is expected.

In the above-described all-solid state secondary batteries, the formation of any of the active material layer of the negative electrode, the solid electrolyte layer, and the active material layer of the positive electrode using a material containing an inorganic solid electrolyte or an active material and the binder particles (binding agent) of a specific polymer compound or the like is proposed. For example, WO2012/173089A describes the addition of a combination of a binding agent made of a specific particulate polymer and an inorganic solid electrolyte to an active material layer or the like. In addition, JP2004-186089A describes a coating fluid for forming an electrode including an electrode active material, granulated particles including an auxiliary conductive agent having electron conductivity and a binding agent, and a liquid capable of dispersing or dissolving these granulated particles as constituent components. Furthermore, JP2015-88486A describes a solid electrolyte composition including an inorganic solid electrolyte, binder particles which are constituted of a specific polymer and have an average particle diameter of 10 nm or more and 1,000 nm or less, and a dispersion medium.

SUMMARY OF THE INVENTION

In recent years, rapid development has been underway for all-solid state secondary batteries, and performance required for all-solid state secondary batteries has also enhanced. Particularly, in all-solid state secondary batteries in which electrode active material layers and a solid electrolyte layer are formed of solid particles, there is a demand for decreasing the interface resistance between the solid particles and enhancing the bonding property thereof in order to improve battery performance such as ion conductivity.

An object of the present invention is to provide a solid electrolyte composition capable of decreasing the interface resistance between solid particles in an all-solid state secondary battery and, furthermore, realizing a favorable bonding property and a method for manufacturing the same. In addition, an object of the present invention is to provide binder particles that are used in the solid electrolyte composition, and a sheet for an all-solid state secondary battery, an electrode sheet for an all-solid state secondary battery, and an all-solid state secondary battery in which the solid electrolyte composition is used. Furthermore, an object of the present invention is to provide a method for manufacturing the binder particles and methods for manufacturing the sheet for an all-solid state secondary battery, the electrode sheet for an all-solid state secondary battery, and the all-solid state secondary battery respectively.

The present inventors found that, in an all-solid state secondary battery, in a case in which the particles of a polymer polymerized in the presence of an ion-conductive substance are used as a binding agent that bonds the solid particles of an inorganic solid electrolyte, an active material, or the like, it is possible to decrease the interface resistance between the solid particles while maintaining a favorable bonding property with the solid particles. The present invention has been completed by further repeating studies on the basis of the above-described finding.

That is, the above-described objects were achieved using the following means.

<1> A solid electrolyte composition comprising: an inorganic solid electrolyte having conductivity for ions of metal elements belonging to Group I or II of the periodic table; binder particles which have an average particle diameter of 10 nm or more and 50,000 nm or less and encompass an ion-conductive substance; and a dispersion medium.

<2> The solid electrolyte composition according to <1>, in which the ion-conductive substance is an inorganic solid electrolyte or a liquid electrolyte.

<3> The solid electrolyte composition according to <1> or <2>, in which the ion-conductive substance is an inorganic solid electrolyte or a liquid electrolyte including a liquid having a boiling point of 100° C. or higher or an ionic liquid and a Li salt.

<4> The solid electrolyte composition according to any one of <1> to <3>, in which a polymer forming the binder particles is a polyamide, a polyimide, a polyurea, a urethane resin, or an acrylic resin.

<5> The solid electrolyte composition according to any one of <1> to <4>, in which a Clog P value of the dispersion medium is 1 or more.

<6> The solid electrolyte composition according to any one of <1> to <5>, in which a polymer forming the binder particles has a repeating unit derived from a monomer having an SP value of 11 $(cal^{1/2}\ cm^{-3/2})$ or more or a partial structure derived from a condensation component having an SP value of 11 $(cal^{1/2}\ cm^{-3/2})$ or more.

<7> The solid electrolyte composition according to <6>, in which a content of the repeating unit or the partial structure in the polymer is 10% by mass or more.

<8> The solid electrolyte composition according to any one of <1> to <7>, in which a mass ratio between the ion-conductive substance and a polymer forming the binder particles is 1:1 to 10 (the ion-conductive substance to the polymer).

<9> The solid electrolyte composition according to any one of <1> to <8>, in which the dispersion medium is selected from an ether compound solvent, an aromatic compound solvent, and an aliphatic compound solvent.

<10> The solid electrolyte composition according to any one of <1> to <9>, in which the inorganic solid electrolyte is represented by Formula (1),

$$L_{a1}M_{b1}P_{c1}S_{d1}A_{e1} \qquad (1)$$

in the formula, L represents an element selected from Li, Na, and K. M represents an element selected from B, Zn, Sn, Si, Cu, Ga, Sb, Al, and Ge. A represents I, Br, Cl, or F. a1 to e1 represent the compositional ratios among the respective elements, and a1:b1:c1:d1:e1 satisfies 1 to 12:0 to 5:1:2 to 12:0 to 10.

<11> The solid electrolyte composition according to any one of <1> to <10>, further comprising: an active material capable of intercalating and deintercalating ions of metal elements belonging to Group I or Group II of the periodic table.

<12> Binder particles which have an average particle diameter of 10 nm or more and 50,000 nm or less and encompass an ion-conductive substance.

<13> The binder particles according to <12>, in which the ion-conductive substance is an inorganic solid electrolyte or a liquid electrolyte.

<14> A method for manufacturing the binder particles according to <12> or <13> comprising: forming the binder particles in the presence of an ion-conductive substance.

<15> The method for manufacturing the binder particles according to <14>, further comprising: polymerizing a polymer forming the binder particles in the presence of the ion-conductive substance.

<16> A method for manufacturing the solid electrolyte composition according to any one of <1> to <11>, comprising: a step of mixing the inorganic solid electrolyte and the binder particles.

<17> A sheet for an all-solid state secondary battery, comprising: a film of the solid electrolyte composition according to any one of <1> or <10> formed on a base material.

<18> An electrode sheet for an all-solid state secondary battery, comprising: a film of the solid electrolyte composition according to <11> formed on a metal foil.

<19> An all-solid state secondary battery comprising: a positive electrode active material layer; a solid electrolyte layer; and a negative electrode active material layer in this order, in which at least one of the positive electrode active material layer, the solid electrolyte layer, and the negative electrode active material layer is a layer including an inorganic solid electrolyte having conductivity for ions of metal elements belonging to Group I or II of the periodic table and binder particles which have an average particle diameter of 10 nm or more and 50,000 nm or less and encompass an ion-conductive substance.

<20> A method for manufacturing an electrode sheet for an all-solid state secondary battery, comprising: a step of forming a film of the solid electrolyte composition according to <11> on a metal foil.

<21> The method for manufacturing an electrode sheet for an all-solid state secondary battery according to <20>, further comprising: a step of encompassing an ion-conductive substance in a polymer forming binder particles so as to prepare the binder particles, and then, mixing an active material, an inorganic solid electrolyte, the binder particles, and a dispersion medium to prepare a solid electrolyte composition.

<22> A method for manufacturing the sheet for an all-solid state secondary battery according to <17>, comprising: a step of mixing an inorganic solid electrolyte, binder particles, and a dispersion medium to prepare a solid electrolyte composition.

<23> A method for manufacturing an all-solid state secondary battery, comprising: manufacturing an all-solid state secondary battery using the method for manufacturing an electrode sheet for an all-solid state secondary battery according to <20> or <21> or the method for manufacturing the sheet for an all-solid state secondary battery according to <22>.

In the present specification, numerical ranges expressed using "to" include numerical values before and after "to" as the lower limit value and the upper limit value.

In the present specification, in the case of being simply expressed, "acryl" or "(meth)acryl" refers to both methacryl and/or acryl.

In the case of being used as a material of a solid electrolyte layer or an active material layer in an all-solid state secondary battery, the solid electrolyte composition of the present invention is capable of decreasing the interface resistance between solid particles and, furthermore, also exhibits an excellent effect of realizing a favorable bonding property. In addition, in the case of being used in combination with an inorganic solid electrolyte and a dispersion medium, the binder particles of the present invention are capable of imparting the above-described excellent effect to a solid electrolyte composition containing the binder particles. Furthermore, the sheet for an all-solid state secondary battery, the electrode sheet for an all-solid state secondary battery, and the all-solid state secondary battery of the present invention use the solid electrolyte composition exhibiting the above-described excellent effect and exhibit excellent performance.

In addition, the manufacturing methods of the present invention are capable of preferably manufacturing the solid electrolyte composition, the binder particles, the sheet for an all-solid state secondary battery, the electrode sheet for an all-solid state secondary battery, and the all-solid state secondary battery respectively.

The above-described characteristics and advantages and other characteristics and advantages of the present invention will be further clarified from the following description with reference to the appropriately accompanied drawings.

DESCRIPTION OF THE PREFERRED EMBODIMENTS

A solid electrolyte composition of the present invention includes a specific inorganic solid electrolyte, binder particles which encompass an ion-conductive substance and have an average particle diameter of 10 nm or more and 50,000 nm or less, and a dispersion medium. Hereinafter, a preferred embodiment thereof will be described below, and, first, an all-solid state secondary battery in which the solid electrolyte composition of the present invention is used will be described.

[All-Solid State Secondary Battery]

An all-solid state secondary battery of the present invention has a positive electrode, a negative electrode facing this positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the negative electrode active material layer, the positive electrode active material layer, and the solid electrolyte layer is preferably formed of the solid electrolyte composition of the present invention described below, and particularly, all of the layers are more preferably formed of the solid electrolyte composition of the present invention.

The kinds of the components and the content ratio therebetween of the active material layers or the solid electrolyte layer formed of the solid electrolyte composition are preferably the same as those in the solid content of the solid electrolyte composition.

Hereinafter, a preferred embodiment of the present invention will be described, but the present invention is not limited thereto.

Figure 1:
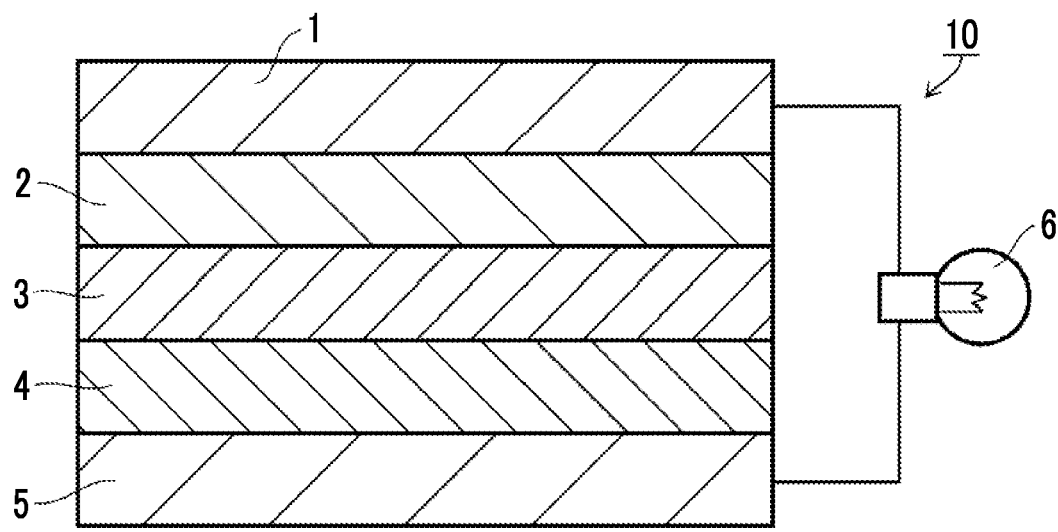
FIG. 1 is a vertical cross-sectional view schematically illustrating an all-solid state secondary battery according to a preferred embodiment of the present invention.

FIG. 1 is a cross-sectional view schematically illustrating an all-solid state secondary battery (lithium ion secondary battery) according to the preferred embodiment of the present invention. In the case of being seen from the negative electrode side, an all-solid state secondary battery 10 of the present embodiment has a structure in which a negative electrode collector 1, a negative electrode active material layer 2, a solid electrolyte layer 3, a positive electrode active material layer 4, and a positive electrode collector 5 are laminated in this order, and adjacent layers are in direct contact with each other. In a case in which the above-described structure is employed, during charging, electrons (e) are supplied to the negative electrode side, and lithium ions ($Li^+$) are accumulated thereon. On the other hand, during discharging, the lithium ions ($Li^+$) accumulated on the negative electrode return to the positive electrode side, and it is possible to supply electrons to an operation portion 6. In the example of the all-solid state secondary battery illustrated in the drawing, an electric bulb is employed as a model of the operation portion 6 and is lit by discharging.

[Positive Electrode Active Material Layer, Solid Electrolyte Layer, and Negative Electrode Active Material Layer]

In the all-solid state secondary battery 10, all of the positive electrode active material layer, the solid electrolyte layer, and the negative electrode active material layer are formed of the solid electrolyte composition of the present invention.

That is, the solid electrolyte layer 3 includes an inorganic solid electrolyte and binder particles which encompass an ion-conductive substance and have an average particle diameter of 10 nm or more and 50,000 nm or less. The solid electrolyte layer, generally, does not include any positive electrode active materials and/or negative electrode active materials. In the solid electrolyte layer 3, the binder particles are present between the solid particles of the inorganic solid electrolyte, the active materials in the adjacent active material layers, and the like, and thus the interface resistance between the solid particles is decreased, and the bonding property is enhanced.

The positive electrode active material layer 4 and the negative electrode active material layer 2 include a positive electrode active material and a negative electrode active material respectively and further include an inorganic solid electrolyte and binder particles which encompass an ion-conductive substance and has an average particle diameter of 10 nm or more and 50,000 nm or less. In a case in which the active material layer contains the inorganic solid electrolyte, it is possible to improve the ion conductivity. In the active material layer, the binder particles are present between solid particles and the like, and thus the interface resistance thereof is decreased, and the bonding property is enhanced.

The kinds of the inorganic solid electrolytes and the binder particles that the positive electrode active material layer 4, the solid electrolyte layer 3, and the negative electrode active material layer 2 contain may be identical to or different from each other.

In the present invention, there are cases in which any or both of the positive electrode active material layer and the negative electrode active material layer will be simply referred to as the active material layer or the electrode active material layer. In addition, there are cases in which any or both of the positive electrode active material and the negative electrode active material will be simply referred to as the active material or the electrode active material.

In the present invention, in a case in which the above-described binder particles are used (contained) in combination of the solid particles of the inorganic solid electrolyte, the active material, or the like, it is possible to decrease the interface resistance between the solid particles and the like, and furthermore, a favorable bonding property can also be realized.

The action and mechanism thereof are not clear but are considered as follows. That is, in a case in which the solid particles and the binder particles are made to coexist, the interface contact area between the binder particles and the solid particles becomes small, and an increase in the interface resistance between the solid particles is suppressed. Furthermore, since the binder particles encompass the ion-conductive substance, it is also possible to build ion conduction paths in the binder particles, and it is also possible to suppress an increase in the interface resistance and decrease the interface resistance. At this time, since the binder particles have a polymer present on the surface, it is possible to suppress the peeling of the solid particles from the collectors or the misfit between the solid particles by maintaining the bonding property between the solid particles and the like. It is considered that, due to the above-described action, excellent battery characteristics such as a high ion conductivity are exhibited.

In the present invention in which the binder particles holding a favorable bonding property with the solid particles and the like are used, in addition to the above-described excellent battery characteristics, it is possible to extend the battery service life by maintaining the contact state between the active materials and the solid electrolyte through the contraction and expansion of the active materials caused by the emission and absorption of the ions of metal elements belonging to Group I or II of the periodic table (the charging and discharging of the all-solid state secondary battery) (the cycle characteristic is excellent).

In the present invention, in a case in which the binder particles are used in combination with an inorganic solid electrolyte represented by Formula (1) below as the solid particles, superior battery characteristics are exhibited.

The mechanism of the binder particles bonding to the solid particles, the active materials, or the collectors is not clear, but is assumed to be attributed to the interaction between a polymer forming the binder particles and the solid particles and the like. Absorption (including chemical absorption and physical absorption), chemical reactions, and the like can be considered as the above-described interaction.

The thicknesses of the positive electrode active material layer 4, the solid electrolyte layer 3, and the negative electrode active material layer 2 are not particularly limited. In a case in which the dimensions of ordinary batteries are taken into account, the thicknesses of the respective layers are preferably 10 to 1,000 µm and more preferably 20 µm or more and less than 500 µm. In the all-solid state secondary battery of the present invention, the thickness of at least one layer of the positive electrode active material layer 4, the solid electrolyte layer 3, or the negative electrode active material layer 2 is still more preferably 50 µm or more and less than 500 µm.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum or an aluminum alloy is more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 µm. In addition, the surface of the collector is preferably provided with protrusions and recesses by means of a surface treatment.

In the present invention, a functional layer, member, or the like may be appropriated interposed or disposed between the respective layers of the negative electrode collector, the negative electrode active material layer, the solid electrolyte layer, the positive electrode active material layer, and the positive electrode collector or on the outside thereof. In addition, the respective layers may be constituted of a single layer or multiple layers.

[Chassis]

The basic structure of the all-solid state secondary battery can be produced by disposing the respective layers described above. Depending on the use, the basic structure alone may be used as an all-solid state secondary battery, but the basic structure may be used in a state of being further enclosed by an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode chassis and a negative electrode chassis and electrically connected to the positive electrode collector and the negative electrode collector respectively. The positive electrode chassis and the negative electrode chassis are preferably integrated by being joined together through a short circuit prevention gasket.

[Solid Electrolyte Composition]

The solid electrolyte composition of the present invention is as described above and will be specifically described below.

(Inorganic Solid Electrolyte)

The solid electrolyte composition of the present invention contains an inorganic solid electrolyte.

A solid electrolyte of the inorganic solid electrolyte refers to a solid-form electrolyte capable of migrating ions therein. The solid electrolyte is clearly differentiated from organic solid electrolytes (polymer electrolytes represented by polyethylene oxide (PEO) or the like and organic electrolyte salts represented by lithium bis(trifluoromethanesulfonyl) imide (LiTFSI)) since the solid electrolyte does not include any organic substances as a principal ion-conductive material. In addition, the inorganic solid electrolyte is a solid in a static state and is thus not disassociated or liberated into cations and anions. Due to this fact, the inorganic solid electrolyte is also clearly differentiated from inorganic electrolyte salts in which cations and anions are disassociated or liberated in electrolytic solutions or polymers ($LiPF_6$, $LiBF_4$, lithium bis(fluorosulfonyl) imide (LiFSI), LiCl, and the like). The inorganic solid electrolyte is not particularly limited as long as the inorganic solid electrolyte has conductivity for ions of metal elements belonging to Group I or II of the periodic table and is generally a substance not having electron conductivity. In a case in which the all-solid state secondary battery of the present invention is a lithium ion battery, the inorganic solid electrolyte preferably has ion conductivity for lithium ions.

As the inorganic solid electrolyte, it is possible to appropriately select and use solid electrolyte materials that are generally used in all-solid state secondary batteries. Typical examples of the inorganic solid electrolyte include (i) sulfide-based inorganic solid electrolytes and (ii) oxide-based inorganic solid electrolytes. In the present invention, a sulfide-based inorganic solid electrolyte is preferably used since it is possible to form a more favorable interface between the active material and the inorganic solid electrolyte.

(i) Sulfide-Based Inorganic Solid Electrolytes

Sulfide-based inorganic solid electrolytes are preferably inorganic solid electrolytes which contain sulfur (S), have ion conductivity for metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases. Examples thereof include lithium ion-conductive inorganic solid electrolytes satisfying a composition represented by Formula (1).

$$L_{a1}M_{b1}P_{c1}S_{d1}A_{e1} \qquad (1)$$

In Formula (1), L represents an element selected from Li, Na, and K and is preferably Li. M represents an element selected from B, Zn, Sn, Si, Cu, Ga, Sb, Al, and Ge. A represents I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the amounts of raw material compounds blended to manufacture the sulfide-based solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials among, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, halogenated lithium (for example, LiI, LiBr, and LiCl) and sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

As specific examples of the sulfide solid electrolyte compound, combination examples of raw materials will be described below. Specific examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Here, the respective raw materials may be mixed together at any ratios. Examples of a method for synthesizing sulfide solid electrolyte materials using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably solid electrolytes which contain oxygen atoms (O), have an ion conductivity for metal elements belonging to Group I or II of the periodic table, and have electron-insulating properties.

The ion conductivity for the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit is not particularly limited, but is realistically $1 \times 10^{-1}$ S/cm or less.

Specific examples of the compounds include $Li_{xa}La_{ya}TiO_3$ [xa satisfies $0.3 \leq xa \leq 0.7$ and ya satisfies $0.3 \leq ya \leq 0.7$.] (LLT); $Li_{xb}La_{yb}Zr_{zb}M^{bb}_{mb}O_{nb}$ ($M^{bb}$ is at least one element selected from Al, Mg, Ca, Sr, V, Nb, Ta, Ti, Ge, In and Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}_{zc}O_{nc}$ ($M^{cc}$ is at least one element selected from C, S, Al, Si, Ga, Ge, In, and Sn, xc satisfies $0 \leq xc \leq 5$, yc satisfies $0 \leq yc \leq 1$, zc satisfies $0 \leq zc \leq 1$, and nc satisfies $0 \leq nc \leq 6$); $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}_{xe}D^{ee}O$ (xe represents a number of 0 or more and 0.1 or less, and $M^{ee}$ represents a divalent metal atom. $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 < zf \leq 10$), $Li_{xg}S_{yg}O_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0 \leq xh \leq 1$ and yh satisfies $0 \leq yh \leq 1$); $Li_7La_3Zr_2O_{12}$ (LLZ) having a garnet-type crystal structure.

In addition, phosphorus compounds containing Li, P, and O are also desirable. Examples thereof include lithium phosphate ($Li_3PO_4$); LiPON in which some of oxygen atoms in lithium phosphate are substituted with nitrogen, $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au); and the like.

Furthermore, it is also possible to preferably use $LiA^1ON$ ($A^1$ is one or more elements selected from Si, B, Ge, Al, C, and Ga) and the like.

Among these, LLT, $Li_{xb}La_{yb}Zr_{zb}M^{bb}_{mb}O_{nb}$ ($M^{bb}$, xb, yb, zb, mb, and nb are as described above), LLZ, $Li_3BO_3$; $Li_3BO_3$—$Li_2SO_4$, and $Li_{xd}(Al, Ga)_{yd}(Ti, Ge)_{zd}Si_{ad}P_{md}O_{nd}$ (xd, yd, zd, ad, md, and nd are as described above) are preferred, and LLZ, LLT, LAGP ($Li_{1.5}Al_{0.5}Ge_{1.5}(PO_4)_3$), or LATP ($[Li_{1.4}Ti_2Si_{0.4}P_{2.6}O_{12}]$—$AlPO_4$) are more preferred.

The inorganic solid electrolyte is preferably particles. The volume-average particle diameter of the particulate inorganic solid electrolyte is not particularly limited, but is preferably 0.01 µm or more and more preferably 0.1 µm or more. The upper limit is preferably 100 µm or less and more preferably 50 µm or less. Meanwhile, the volume-average particle diameter of the inorganic solid electrolyte is measured in the following order. One percent by mass of a dispersion liquid is diluted and prepared using the inorganic solid electrolyte particles and water (heptane in a case in which the inorganic solid electrolyte is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced per level, and the average values thereof are employed.

In a case in which the satisfaction of both the battery performance and the interface resistance-reducing and maintaining effect is taken into account, the content of the inorganic solid electrolyte in the solid electrolyte composition is preferably 5% by mass or more, more preferably 70% by mass or more, and particularly preferably 90% by mass or more with respect to 100% by mass of the solid content. From the same viewpoint, the upper limit is preferably 99.9% by mass or less, more preferably 99.5% by mass or less, and particularly preferably 99% by mass or less.

Here, in a case in which the solid electrolyte composition contains the positive electrode active material or the negative electrode active material, regarding the content of the inorganic solid electrolyte in the solid electrolyte composition, the total content of the positive electrode active material or the negative electrode active material and the inorganic solid electrolyte is preferably in the above-described range.

Meanwhile, the solid content in the present specification refers to a component that does not disappear due to volatilization or evaporation in the case of being dried at 170° C. for six hours in a nitrogen atmosphere. Typically, the solid content indicates components other than a dispersion medium described below.

These inorganic solid electrolytes may be used singly or two or more inorganic solid electrolytes may be used in combination.

(Binder Particles)

The solid electrolyte composition of the present invention also preferably contains binder particles which have an average particle diameter of 10 nm or more and 50,000 nm or less and encompass an ion-conductive substance.

The binder particles are formed of an ion-conductive substance and a polymer, and the ion-conductive substance is encompassed in the particles (the above-described polymer).

In the present invention, "the ion-conductive substance being encompassed" refers to a state in which, in the binder particles, the ion-conductive substance is fully or partially coated with the polymer. Therefore, in the present invention, some of the surface of the ion-conductive substance may be exposed, and the ion-conductive substance being encompassed refers to a state in which, for example, the ion-conductive substance is coated with the polymer having a mass ratio of 5% or more of the ion-conductive substance.

In the present invention, the mass ratio of the polymer encompassing the ion-conductive substance to the ion-conductive substance will be referred to as "the coating ratio or the encompassing ratio". In a case in which the binder particles in which the ion-conductive substance is encompassed by the polymer are included in the solid electrolyte composition, the solid particles of the inorganic solid electrolyte, the active materials, and the like are strongly bonded together, and furthermore, the interface resistance between the solid particles and the like is decreased.

From the above-described viewpoint, the ion-conductive substance is preferably coated with the polymer having a mass ratio of 10% or more, more preferably coated with the polymer of 30% or more, and particularly preferably coated with the polymer of 60% or more. Meanwhile, the upper limit of the coating ratio of the ion-conductive substance is not particularly limited, but the ion-conductive substance is preferably coated with the polymer having a mass ratio of 100% or less.

The coating ratio of the ion-conductive substance can be computed as described below.

In a mixture of the binder particles and a dispersion medium, the binder particles encompassing the ion-conductive substance and the mixture of the dispersion medium are centrifugally separated at 30° C. and 3,500 rpm for 30 minutes, and the mass $I_s$ of the ion-conductive substance in the supernatant is determined. The coating ratio is calculated using the obtained determined amount value from the following calculation expression.

$$(I_p-I_s)/I_p \times 100 (\%) \qquad \text{Expression}$$

In the expression, $I_p$ represents the mass (mass) of the ion-conductive substance in the mixture of the binder particles encompassing the ion-conductive substance and the dispersion medium, and $I_s$ represents the mass (mass) of the ion-conductive substance in the supernatant.

In each of the solid electrolyte composition and the all-solid state secondary battery of the present invention, the coating ratio is calculated in the same manner as in the above-described method after the extraction of the ion-conductive substance and the binder particles.

The ion-conductive substance may be coated (encompassed) with the polymer or may be a complex of the polymer and the ion-conductive substance. In addition, in the binder (particles), the polymer may be attached or adhered to the surface of the ion-conductive substance or the ion-conductive substance is coated or buried with the polymer. At this time, it is considered that the ion-conductive substance is incorporated into the polymer due to the difference from the dispersion medium between hydrophilicity and hydrophobicity or the polymer is adsorbed (including chemical adsorption and physical adsorption) or chemically bonded to the ion-conductive substance, whereby the polymer encompasses the ion-conductive substance.

The average particle diameter of the binder particles is 50,000 nm or less, preferably 1,000 nm or less, more preferably 500 nm or less, still more preferably 300 nm or less, and particularly preferably 250 nm or less. The lower limit value is 10 nm or more, preferably 30 nm or more, more preferably 50 nm or more, and particularly preferably 100 nm or more. In a case in which the size of the binder particles is set in the above-described range, the area of a resistance coating with the solid particles and the like becomes small, and it is possible to decrease the resistance.

That is, it is possible to realize favorable adhesiveness and the suppression of interface resistance.

In the present invention, the average particle diameter of the binder particles refers to the average particle diameter in a state of encompassing the ion-conductive substance.

Unless particularly otherwise described, the average particle diameter of the binder particles refers to an average particle diameter according to the following measurement conditions and definition.

One percent by mass of a dispersion liquid is diluted and prepared using the binder particles and an appropriate solvent (an organic solvent that is used to prepare the solid electrolyte composition, for example, heptane) in a 20 mL sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is considered as the average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

Meanwhile, in a case in which the all-solid state secondary battery is used, the average particle diameter can be measured by, for example, disassembling the all-solid state secondary battery, peeling the active material layer or the solid electrolyte layer, measuring the average particle diameter of the material according to the above-described method for measuring the average particle diameter of the binder particles, and subtracting the measurement values of the average particle diameters of particles other than the binder particles which have been measured in advance.

Ion-Conductive Substance

The ion-conductive substance that is encompassed in the binder particles is not particularly limited as long as the ion-conductive substance is a substance having conductivity for ions of metal elements belonging to Group I or II of the periodic table. The ion conductivity is preferably the same kind of conductivity for metal ions as the ion conductivity exhibited by the inorganic solid electrolyte in the solid electrolyte composition of the present invention. The ion conductivity for the ion-conductive substance that is encompassed in the binder particles is not particularly limited; however, for example, a substance exhibiting an ion conductivity of $1 \times 10^{-7}$ S/cm or more at room temperature (25° C.) is preferably used. The ion conductivity of the ion-conductive substance can be measured as described below. That is, in a case in which the ion-conductive substance is a liquid, a 250 μm-thick TEFLON (registered trademark) spacer (with a hole having a diameter of 6 mm) is prepared, the hole is filled with the ion-conductive substance, and the ion conductivity can be obtained using a cell sandwiched between two stainless steel plates and an alternating current impedance method at 30° C. In a case in which the ion-conductive substance is a solid, the ion conductivity can be measured using the same method as in the measurement of the ion conductivity of the solid electrolyte composition which will be described below.

The ion-conductive substance is not particularly limited as long as the ion-conductive substance is preferably a substance exhibiting the above-described ion conductivity, and examples thereof include an inorganic solid electrolyte, a polymer solid electrolyte, a gel electrolyte, a liquid electrolyte, and the like. Among these, an inorganic solid electrolyte or a liquid electrolyte is preferred, and a sulfide-based inorganic solid electrolyte or a liquid electrolyte is more preferred.

In the present invention, the ion-conductive substance may be used singly or two or more ion-conductive substances may be jointly used.

(i) Inorganic Solid Electrolyte

The inorganic solid electrolyte is not particularly limited, examples thereof include the inorganic solid electrolyte that is included in the solid electrolyte composition of the present invention, the sulfide-based inorganic solid electrolyte, an oxide-based inorganic solid electrolyte, or the like is preferred, and the sulfide-based inorganic solid electrolyte is particularly preferred. The inorganic solid electrolyte that is used in the binder particles may be identical to or different from the inorganic solid electrolyte that is included in the solid electrolyte composition of the present invention.

(ii) Solid Polymer Electrolyte

The solid polymer electrolyte (SPE) is not particularly limited, and examples thereof include polyethylene oxides (PEO), polyacrylonitriles (PAN), and polycarbonates (PC) which contain (dissolve) at least one supporting electrolyte.

The supporting electrolyte is not particularly limited, examples thereof include inorganic lithium salts, fluorine-containing organic lithium salts, oxalate borate salts, and the like, lithium salts (inorganic lithium salts and fluorine-containing organic lithium salts) are preferred, and inorganic lithium salts are more preferred. As these supporting electrolytes, it is possible to use electrolytes that are generally used in secondary batteries without any particular limitations. For example, it is possible to use the supporting electrolytes described in Paragraphs "0093" to "0096" of JP2015-046376A, the content of which is preferably incorporated into the present specification.

Examples of the supporting electrolyte include electrolytes (Li salts) represented by the following formulae.

$$\text{Li}A_xD_y \quad \text{(a-1)}$$

In Formula (a-1), A is P, B, As, Sb, Cl, Br, or I or represents a combination of two or more elements selected from P, B, As, Sb, Cl, Br, and I. D represents F or O. x is 1 to 6 and more preferably 1 to 3. y is 1 to 12 and more preferably 4 to 6.

Preferred specific examples of the electrolyte represented by Formula (a-1) include inorganic fluoride salts selected from $LiPF_6$, $LiBF_4$, $LiAsF_6$, and $LiSbF_6$ and perhalogen acid salts selected from $LiClO_4$, $LiBrO_4$, and $LiIO_4$.

$$\text{LiN}(R^f SO_2)_2 \quad \text{(a-2)}$$

In Formula (a-2), $R^f$ represents a fluorine atom or a perfluoroalkyl group. The number of carbon atoms in the perfluoroalkyl group is preferably 1 to 4 and more preferably 1 or 2.

Preferred specific examples of the electrolyte represented by Formula (a-2) include perfluoroalkanesulfonylimide salts selected from $LiN(CF_3SO_2)_2$, $LiN(CF_3CF_2SO_2)_2$, $LiN(FSO_2)_2$, and $LiN(CF_3SO_2)(C_4F_9SO_2)$.

Among these, from the viewpoint of the ion conductivity after being dissolved in a solvent, the supporting electrolyte is preferably a salt of a metal belonging to Group I or II of the periodic table, more preferably a metallic salt selected from $LiPF_6$, $LiBF_4$, $LiClO_4$, $LiBrO_4$, $LiN(CF_3SO_2)_2$, $LiN(FSO_2)_2$, and $LiN(CF_3CF_2SO_2)$, still more preferably a metallic salt selected from $LiPF_6$, $LiBF_4$, $LiClO_4$, LiN ($CF_3SO_2)_2$, and $LiN(FSO_2)_2$, and particularly preferably a metallic salt selected from $LiClO_4$, $LiN(CF_3SO_2)_2$, and $LiN(FSO_2)_2$.

In the present invention, as the salt of a metal belonging to Group I or II of the periodic table, it is possible to use one or more metallic salts. An anion in an ionic liquid and an anion in the supporting electrolyte may be identical to or different from each other.

(iii) Gel Electrolyte

The gel electrolyte is not particularly limited, and examples thereof include electrolytes obtained by swelling PEO, polyvinylidene fluoride (PVDF), polymethyl methacrylate (PMMA), or polyacrylonitrile (PAN) using a liquid electrolyte described below.

(iv) Liquid Electrolyte

The liquid electrolyte is not particularly limited, and examples thereof include electrolytic solutions including the supporting electrolyte such as a Li salt, electrolytic solutions including the supporting electrolyte and an ionic liquid, and the like. The above-described electrolytic solutions are not particularly limited, and examples thereof include solutions including at least one supporting electrolyte described above and the following liquid.

In the present invention, the liquid electrolyte is encompassed in the polymer together with the supporting electrolyte in a liquid (solvent) or ionic liquid form. Therefore, the encompassed electrolytic solution functions as the ion-conductive substance.

The above-described electrolytic solution including the supporting electrolyte is not particularly limited as long as the electrolytic solution is a liquid including the supporting electrolyte, but is preferably an electrolytic solution including the supporting electrolyte and a liquid (solvent).

The liquid is not particularly limited, but is preferably a non-aqueous solvent, more preferably an aprotic organic solvent, and particularly preferably an aprotic organic solvent having 2 to 10 carbon atoms. The non-aqueous solvent is preferably a compound having an ether group, a carbonyl group, an ester group, or a carbonate group. The compound may have a substituent, and examples thereof include a substituent Z described below.

Examples of the non-aqueous solvent include ethylene carbonate (EC), propylene carbonate, butylene carbonate, dimethyl carbonate (DMC), diethyl carbonate (DEC), ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, dimethyl sulfoxide phosphoric acid, and the like. The non-aqueous solvent may be used singly or two or more non-aqueous solvents may be jointly used.

Among these, at least one from the group consisting of ethylene carbonate, propylene carbonate, dimethyl carbonate, diethyl carbonate, ethyl methyl carbonate, and γ-butyrolactone is preferred. Particularly, a combination of a high-viscosity (high-permittivity) solvent (for example, the relative permittivity ε≥30) such as ethylene carbonate or propylene carbonate and a low-viscosity solvent (for example, the viscosity≤1 mPa·s) such as dimethyl carbonate, ethyl methyl carbonate, or diethyl carbonate is preferred. In a case in which the above-described combination is used as the non-aqueous solvent, the dissociating property of electrolyte salts and the mobility of ions improve.

In addition, the siloxane oligomers described in Paragraphs "0029" to "0043" of JP2015-089468A are also preferred as the non-aqueous solvent.

The non-aqueous solvent that is used in the present invention is not limited to the solvents exemplified above.

In the electrolytic solution, the combination of the supporting electrolyte and the liquid is not particularly limited and can be appropriately set depending on the purpose.

The electrolytic solution including the supporting electrolyte and an ionic liquid is not particularly limited, and examples thereof include solutions obtained by dissolving at least one supporting electrolyte described above in an ionic liquid. The ionic liquid is not particularly limited, and it is possible to use, for example, a chemical substance selected from compounds made of a combination of a cation and an anion described below.

(iv-i) Cation

Examples of the cation include an imidazolium cation having the following substituent, a pyridinium cation having the following substituent, a piperidinium cation having the following substituent, a pyrrolidinium cation having the following substituent, a morpholinium cation having the following substituent, a phosphonium cation having the following substituent, a quaternary ammonium cation having the following substituent, and the like.

As the cation, it is also possible to use a combination of one or more cations described above.

An imidazolium cation, a quaternary ammonium cation, a piperidinium cation, or a pyrrolidinium cation is preferred, an imidazolium cation, a quaternary ammonium cation, a piperidinium cation, or a pyrrolidinium cation is more preferred, and a quaternary ammonium cation, a piperidinium cation or a pyrrolidinium cation is still more preferred.

Examples of the substituent include an alkyl group (preferably having 1 to 8 carbon atoms and more preferably having 1 to 4 carbon atoms), a hydroxyalkyl group (preferably having 1 to 3 carbon atoms), an alkyloxyalkyl group (preferably having 1 to 8 carbon atoms and more preferably 1 to 4 carbon atoms), an ether group, an allyl group, an aminoalkyl group (preferably having 1 to 8 carbon atoms and more preferably having 1 to 4 carbon atoms), and an aryl group (preferably having 1 to 12 carbon atoms and more preferably 1 to 8 carbon atoms). The substituent may form a cyclic structure by containing a cation portion. The substituent may further have the substituent Z described below.

(iv-ii) Anion

Examples of the anion include a chloride ion, a bromide ion, an iodide ion, a boron tetrafluoride ion, a nitric acid ion, a dicyanamide ion, an acetic acid ion, an iron tetrachloride ion, a bis(trifluoromethanesulfonyl) imide ion, a bis(fluorosulfonyl) imide ion, a bis(perfluorobutylmethanesulfonyl) imide ion, a hexafluorophosphoric acid ion, a trifluoromethanesulfonic acid ion, and the like.

As the anion, it is also possible to use a combination of one or more anions described above.

A chloride ion, a bromide ion, a boron tetrafluoride ion, a nitric acid ion, a dicyanamide ion, a bis(trifluoromethanesulfonyl) imide ion, a bis(fluorosulfonyl) imide ion, or a hexafluorophosphoric acid ion is preferred, a boron tetrafluoride ion, a bis(trifluoromethanesulfonyl) imide ion, a bis(fluorosulfonyl) imide ion, a hexafluorophosphoric acid ion, or a dicyanamide ion is more preferred, and a bis (trifluoromethanesulfonyl) imide ion, a bis(fluorosulfonyl) imide ion, or a dicyanamide ion is still more preferred.

Examples of the ionic liquid include 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl) ammonium tetrafluoroborate, 1-ethyl-3-methylimidazolium bis(trifluoromethanesulfonyl) imide, 1-ethyl-3-methylimidazolium bis(fluorosulfonyl) imide, 1-ethyl-3-methylimidazolium bistrifluoromethanesulfonic acid, 1-ethyl-3-methylimidazolium dicyanamide, 1-butyl-1-methylpyrrolidinium bis(trifluoromethanesulfonyl) imide, trimethylbutylammonium bis(trifluoromethanesulfonyl) imide, N, N-diethyl-N-methyl-N-(2-methoxyethyl) ammonium bis(trifluoromethanesulfonyl) imide, N-(2-methoxyethyl)-N-methylpyrrolidinium tetrafluoroborate, 1-butyl-1-methylpyrrolidinium imidazolium bis(fluorosulfonyl) imide, (2-acryloylethyl) trimethylammonium bis(trifluoromethanesulfonyl) imide, trihexyltetradecylphosphonium chloride, and the like.

In the electrolytic solution, the combination of the supporting electrolyte and the ionic liquid is not particularly limited and can be appropriately set depending on the purpose.

In a case in which the electrolytic solution is used as the ion-conductive substance, the boiling point of the solvent in the electrolytic solution is preferably 100° C. or higher and more preferably 150° C. or higher. Meanwhile, the upper limit of the boiling point is practically 500° C. or lower. Meanwhile, in a case in which the ionic liquid is used as the liquid, what has been described above may not be true.

Polymer

The structure of the polymer forming the binder particles is not particularly limited as long as the polymer is a substance capable of encompassing the ion-conductive substance.

Examples of the polymer forming the binder particles include a fluorine-containing resin, a hydrocarbon-based thermoplastic resin, an acrylic resin, a vinyl resin, a urethane resin (hereinafter, also referred to as polyurethane), polyurea, polyamide, polyimide, polyester, polyether, and the like. Among these, polyamide, polyimide, polyurea, a urethane resin, or an acrylic resin (an acrylic acid ester resin) is preferred, and polyurea, a urethane resin, or an acrylic resin is particularly preferred. The polymer may be used singly or two or more polymers described above may be jointly used.

(i) Acrylic Resin

The acrylic resin is a polymer having a repeating unit derived from an acrylic monomer as a repeating unit that forms the main chain of the acrylic resin. As the acrylic monomer, a monomer selected from (meth)acrylic acid, (meth)acrylic acid esters, (meth)acrylic acid amides, and (meth)acrylonitrile is preferably used.

The number of polymerizable groups such as a vinyl group in the monomer is not particularly limited, but is preferably 1 to 8 and more preferably 1 to 4.

The polymer including a repeating unit derived from an acrylic monomer is, specifically, preferably a polymer including a repeating unit derived from at least one of monomers represented by Formulae (a-1) to (a-8). The number of the monomers represented by Formulae (a-1) to (a-8) which serve as the repeating unit in the polymer may be one or more.

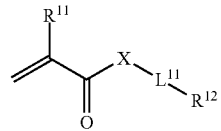
(a-1)

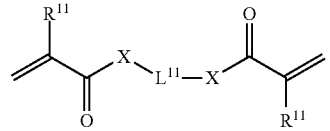
(a-2)

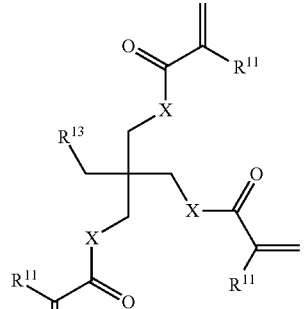
(a-3)

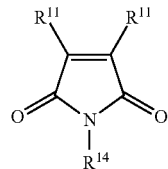
(a-4)

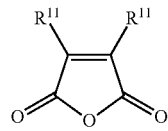
(a-5)

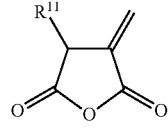
(a-6)

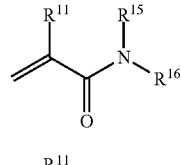
(a-7)

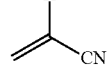
(a-8)

In the formulae, $R^{11}$ represents a hydrogen atom, a hydroxy group, a cyano group, a halogen atom, an alkyl group, an alkenyl group, an alkynyl group, or an aryl group.

The alkyl group that can be used as $R^{11}$ is not particularly limited, an alkyl group having 1 to 24 carbon atoms is preferred, an alkyl group having 1 to 12 carbon atoms is more preferred, and an alkyl group having 1 to 6 carbon atoms is particularly preferred.

The alkenyl group that can be used as RH is not particularly limited, an alkenyl group having 2 to 24 carbon atoms is preferred, an alkenyl group having 2 to 12 carbon atoms is more preferred, and an alkenyl group having 2 to 6 carbon atoms is particularly preferred.

The alkynyl group that can be used as RH is not particularly limited, an alkynyl group having 2 to 24 carbon atoms is preferred, an alkynyl group having 2 to 12 carbon atoms is more preferred, and an alkynyl group having 2 to 6 carbon atoms is particularly preferred.

The aryl group that can be used as RH is not particularly limited, an aryl group having 6 to 22 carbon atoms is preferred, and an aryl group having 6 to 14 carbon atoms is more preferred.

Examples of the halogen atom that can be used as RH include a fluorine atom, a chlorine atom, a bromine atom, and an iodine atom, and a fluorine atom, a chlorine atom, or a bromine atom is preferred.

Among these, $R^{11}$ is preferably a hydrogen atom or an alkyl group and more preferably a hydrogen atom or methyl.

In a case in which $R^{11}$ is a group which may have a substituent (an alkyl group, an alkenyl group, an alkynyl group, or an aryl group), $R^{11}$ may further have another substituent. Examples of the substituent include the substituent Z described below, and, among these, a halogen atom (a fluorine atom or the like), a hydroxy group, a carboxy group, an ester group, and an amide group are preferred.

$R^{12}$ represents a hydrogen atom or a substituent. The substituent is not particularly limited, and examples thereof include the substituent Z described below. Among these, a hydrogen atom, an alkyl group (preferably having 1 to 24 carbon atoms, more preferably having 1 to 12 carbon atoms, and particularly preferably having 1 to 6 carbon atoms), an alkenyl group (preferably having from 2 to 12 carbon atoms and more preferably having 2 to 6 carbon atoms), an aryl group (preferably having 6 to 22 carbon atoms and more preferably having 6 to 14 carbon atoms), an aralkyl group (preferably having 7 to 23 carbon atoms and more preferably having 7 to 15 carbon atoms), an alkoxy group (preferably having 1 to 12 carbon atoms, more preferably having 1 to 6 carbon atoms, and particularly preferably having 1 to 3 carbon atoms), an aryloxy group (preferably having 6 to 22 carbon atoms, more preferably having 6 to 14 carbon atoms, and particularly preferably having 6 to 10 carbon atoms), an aralkyloxy group (preferably having 7 to 23 carbon atoms, more preferably having 7 to 15 carbon atoms, and particularly preferably having 7 to 11 carbon atoms), a cyano group, a carboxy group, a hydroxy group, a thiol group (a sulfanyl group), a sulfonic acid group, a phosphoric acid group, a phosphonic acid group, an aliphatic heterocyclic group containing an oxygen atom (preferably having 2 to 12 carbon atoms and more preferably having 2 to 6 carbon atoms), a (meth) acryloyl group, an amino group, and an ammonium group are preferred.

Examples of the amino group that can be used as $R^{12}$ include an unsubstituted amino group ($NH_2$) and a mono- or di-substituted amino group ($NR^N{}_2$). $R^N$ represents a hydrogen atom or a substituent. Examples of the substituent include the substituent Z described below, and, among these, an alkyl group (preferably having 1 to 12 carbon atoms, more preferably having 1 to 4 carbon atoms, and particularly preferably having 1 or 2 carbon atoms; a structure forming a cyclic structure including an amino group is also preferred) and an aryl group (preferably having 6 to 22 carbon atoms, more preferably having 6 to 14 carbon atoms) are preferred, and an alkyl group having 1 or 2 carbon atoms is particularly preferred. At least one of the two $R^N$'s is a substituent.

Examples of the ammonium group (salt) that can be used as $R^{12}$ may have a substituent. Examples of the substituent include the substituent Z described below, and, among these, an alkyl group (preferably having 1 to 12 carbon atoms, more preferably having 1 to 4 carbon atoms, and particularly preferably having 1 or 2 carbon atoms; a structure forming a cyclic structure including an amino group is also preferred) and an aryl group (preferably having 6 to 22 carbon atoms, more preferably having 6 to 14 carbon atoms) are preferred, and an alkyl group having 1 or 2 carbon atoms is particularly preferred. A counter ion of the ammonium group is not particularly limited, and examples thereof include halide ions (among these, $Cl^-$, $Br^-$, and $I^-$ are preferred, and $Cl^-$ is particularly preferred), inorganic fluoride ions (examples thereof include $PF_6^-$, $BF_4^-$, $AsF_6^-$, and $SbF_6^-$, and $PF_6^-$ and $BF_4^-$ are particularly preferred), perhalogen acid ions (examples thereof include $ClO_4^-$, $BrO_4^-$, $IO_4^-$, and $ClO_4^-$ is particularly preferred), and bissulfonylimide ions (examples thereof include $(CF_3SO_2)_2^-$, $N(CF_3CF_2SO_2)_2^-$, $N(FSO_2)_2^-$, and $N(CF_3SO_2)(C_4F_9SO_2)$, and $N(CF_3SO_2)_2$ or $N(FSO_2)_2^-$ is particularly preferred). Among these, halide ions and bissulfonylimide ions are preferred.

Among these, $R^{12}$ is preferably a hydrogen atom, an alkyl group, a cyano group, a phenyl group, a carboxy group, a hydroxy group, a sulfonic acid group, a phosphoric acid group, an aliphatic heterocyclic group containing an oxygen atom, an amino group, or an ammonium group, more preferably a hydrogen atom, an alkyl group having 1 to 6 carbon atoms, a carboxy group, a phosphoric acid group, a hydroxy group, an amino group, or an ammonium group, and particularly preferably a hydrogen atom, an alkyl group having 1 to 4 carbon atoms, a carboxy group, a phosphoric acid group, or a hydroxy group.

In a case in which $R^{12}$ is a group which may have a substituent, $R^{12}$ may further have another substituent. Examples of the substituent include the substituent Z described below, and, among these, a halogen atom (preferably a fluorine atom or a chlorine atom), an alkyl group, a carbamoyl group, and a hydroxy group are preferred.

$R^{13}$ represents a hydrogen atom, an alkyl group, a hydroxy group-containing group, or a carboxy group-containing group. A hydrogen atom, an alkyl group having 1 to 6 carbon atoms (preferably having 1 to 3 carbon atoms), a hydroxy group-containing group having 0 to 6 carbon atoms (preferably having 0 to 3 carbon atoms), and a carboxy group-containing group having 1 to 6 carbon atoms (preferably having 1 to 3 carbon atoms) are preferred. Meanwhile, $R^{13}$ may be the following linking group $L^{11}$ (for example, an oxygen atom) and constitute a dimer in this portion.

The hydroxy group-containing group is not particularly limited as long as the group has at least one hydroxy group, and examples thereof include a hydroxy group, a hydroxyethyl group, a hydroxybutyl group, and the like. The carboxy group-containing group is not particularly limited as long as the group has at least one carboxy group, and examples thereof include a carboxy group, a carboxyethyl group, a (meth)acryloyloxy group, and the like.

In the present invention, an "xxx group-containing group" refers to a group made of an xxx group alone and a group made up of an xxx group and a linking group. Here, the linking group is not particularly limited, and examples thereof include the linking group $L^{11}$ described below (excluding a single bond).

$R^{14}$ represents a hydrogen atom or a substituent. Examples of the substituent that can be used as $R^{14}$ include the substituent Z described below. Among these, $R^{14}$ is preferably a hydrogen atom, an alkyl group (preferably having 1 to 24 carbon atoms, more preferably having 1 to 12 carbon atoms, and particularly preferably having 1 to 6 carbon atoms), an alkenyl group (preferably having from 2 to 12 carbon atoms and more preferably having 2 to 6 carbon atoms), an aryl group (preferably having 6 to 22 carbon atoms and more preferably having 6 to 14 carbon atoms), or an aralkyl group (preferably having 7 to 23 carbon atoms and more preferably having 7 to 15 carbon atoms). Among these, a hydrogen atom, methyl, ethyl, propyl, butyl, and phenyl are particularly preferred.

$R^{15}$ and $R^{16}$ represent a substituent. Examples of the substituent that can be used as $R^{15}$ or $R^{16}$ include the substituent Z described below. Among these, $R^{15}$ or $R^{16}$ is preferably an alkyl group (preferably having 1 to 24 carbon atoms, more preferably having 1 to 12 carbon atoms, and particularly preferably having 1 to 6 carbon atoms), an alkenyl group (preferably having from 2 to 12 carbon atoms and more preferably having 2 to 6 carbon atoms), an aryl group (preferably having 6 to 22 carbon atoms and more preferably having 6 to 14 carbon atoms), or an aralkyl group (preferably having 7 to 23 carbon atoms and more preferably having 7 to 15 carbon atoms). Among these, a hydrogen atom, methyl, ethyl, propyl, butyl, and phenyl are particularly preferred.

$R^{15}$ and $R^{16}$ may bond together and form a ring including an N atom. At this time, $R^{15}$ and $R^{16}$ may bond together through an oxygen atom, a sulfur atom, or the like.

$L^{11}$ represents a single bond or a linking group. The linking group is preferably a hydrocarbon linking group [an alkylene group having 1 to 10 carbon atoms (more preferably having 1 to 6 carbon atoms and still more preferably having 1 to 3 carbon atoms), an alkenylene group having 2 to 10 carbon atoms (more preferably having 2 to 6 carbon atoms and more preferably having 2 to 4), an alkynylene groups having 2 to 10 carbon atoms (more preferably having 2 to 6 carbon atoms and still more preferably having 2 to 4 carbon atoms), and an arylene groups having 6 to 22 carbon atoms (more preferably having 6 to 10 carbon atoms), or a combination thereof], a hetero linking group [a carbonyl group (—CO—), a thiolcarbonyl group (—CS—), an ether group (—O—), a thioether group (—S—), an imino group (—NR$^N$—), an ammonium linking group (—NR$^N_2{}^+$—, a polysulfide group (having 1 to 8 sulfur atoms), an imine linking group (R$^N$—N=C<, —N=C(R$^N$)—), a sulfonyl group (—SO$_2$—), a sulfinyl group (—SO—), a phosphoric acid linking group (—O—P(OH)(O)—O—), a phosphonic acid linking group (—P(OH)(O)—O—), or a combination thereof], or a linking group made of a combination thereof. $R^N$ in $L^{11}$ is the same as $R^N$ in the amino group that may be used as $R^{12}$.

Meanwhile, in a case in which the substituents or the linking groups are condensed and form a ring, the hydrocarbon linking groups may appropriately form a double bond or a triple bond and link together. The ring to be formed is preferably a five-membered ring or a six-membered ring. The five-membered ring is preferably a nitrogen-containing five-membered ring, and examples of a compound forming the ring include pyrrole, imidazole, pyrazole, indazole, indole, benzoimidazole, pyrrolidine, imidazoline, pyrazolidine, indoline, carbazole, derivatives thereof, and the like. Examples of the six-membered ring include piperidine, morpholine, piperazine, and derivatives thereof. In addition, in a case in which the compound includes an aryl group, a heteroring group, or the like, the group may be a single ring or a condensed ring, and, similarly, may be substituted or unsubstituted.

In a case in which $L^{11}$ is a linking group made of combinations, the number of combinations is not particularly limited, but is, for example, preferably 2 to 30, more preferably 2 to 16, still more preferably 2 to 8, and particularly preferably 2 or 3. Examples of the linking group made of combinations include an alkylene group having 1 to 6 carbon atoms (preferably having 1 to 3 carbon atoms), an arylene group having 6 to 24 carbon atoms (preferably having 6 to 10 carbon atoms), an oxygen atom, a sulfur atom, an imino group (NR$^N$), a carbonyl group, a (poly)alkyleneoxy group, a (poly)ester group, a (poly)amide group, and groups relating to these combinations. Among these, an alkylene group having 1 to 3 carbon atoms, an oxygen atom, a carbonyl group, a (poly)alkyleneoxy group, a (poly)ester group, and groups relating to these combinations are more preferred. Additionally, examples thereof include linking groups having a monomer exemplified below.

Among these, $L^{11}$ is more preferably a single bond, an alkylene group (preferably having 1 to 6 carbon atoms and more preferably having 1 to 3 carbon atoms), a carbonyl group, an ether group, an imino group, a sulfonyl group, a phosphoric acid linking group, or a linking group made of a combination thereof. A single bond, an alkylene group having 1 to 3 carbon atoms, a carbonyl group, an ether group, an imino group, and a linking group made of a combination thereof are particularly preferred.

In a case in which $L^{11}$ is a group which may have a substituent, $L^{11}$ may further have another substituent. Examples of the substituent include the substituent Z described below, and, among these, a halogen atom (preferably a fluorine atom or a chlorine atom), an alkyl group, an acyl group, a carbamoyl group, and a hydroxy group are preferred.

X represents —O— or >NH.

The polymer having an acrylic monomer may have a vinyl-based monomer. The vinyl-based monomer is not particularly limited as long as the monomer is a monomer having a carbon unsaturated bond (excluding the above-described acrylic monomer). Examples thereof include a styrene monomer, a vinyl ether monomer, a cyclic olefin monomer (such as norbornene), a diene monomer, and the like. The monomer may further have a substituent. Examples of the substituent include the substituent Z described below, and, among these, a halogen atom (preferably a fluorine atom or a chlorine atom), an alkyl group, an acyl group, a carbamoyl group, a hydroxy group, and a carboxyl group are preferred.

Hereinafter, examples of the acrylic monomer and the vinyl-based monomer will be illustrated, but the present invention is not limited thereto. In the following formulae, n represents 1 to 1,000,000 and is preferably 1 to 10,000 and more preferably 1 to 500 unlike n in the above description.

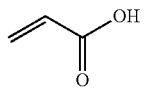

A-1

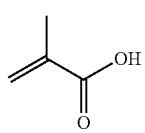

A-2

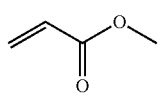

A-3

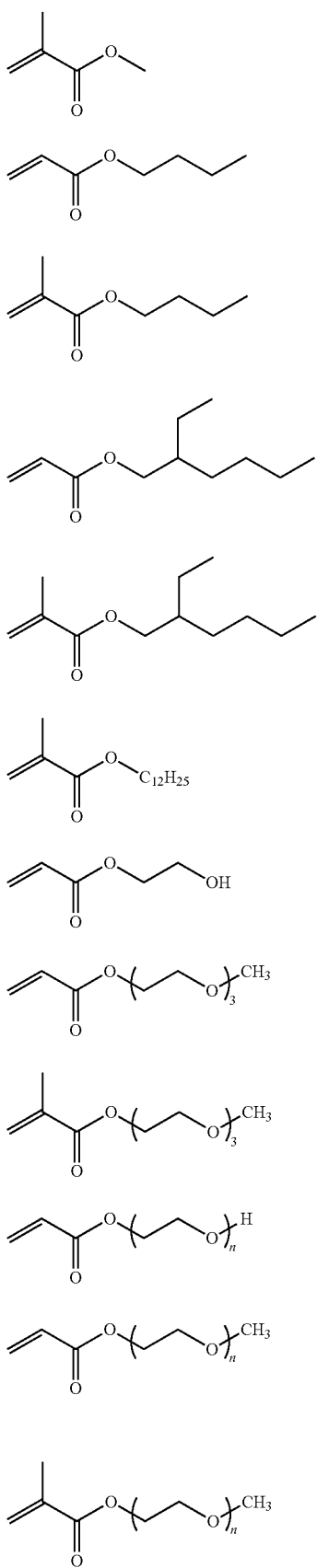
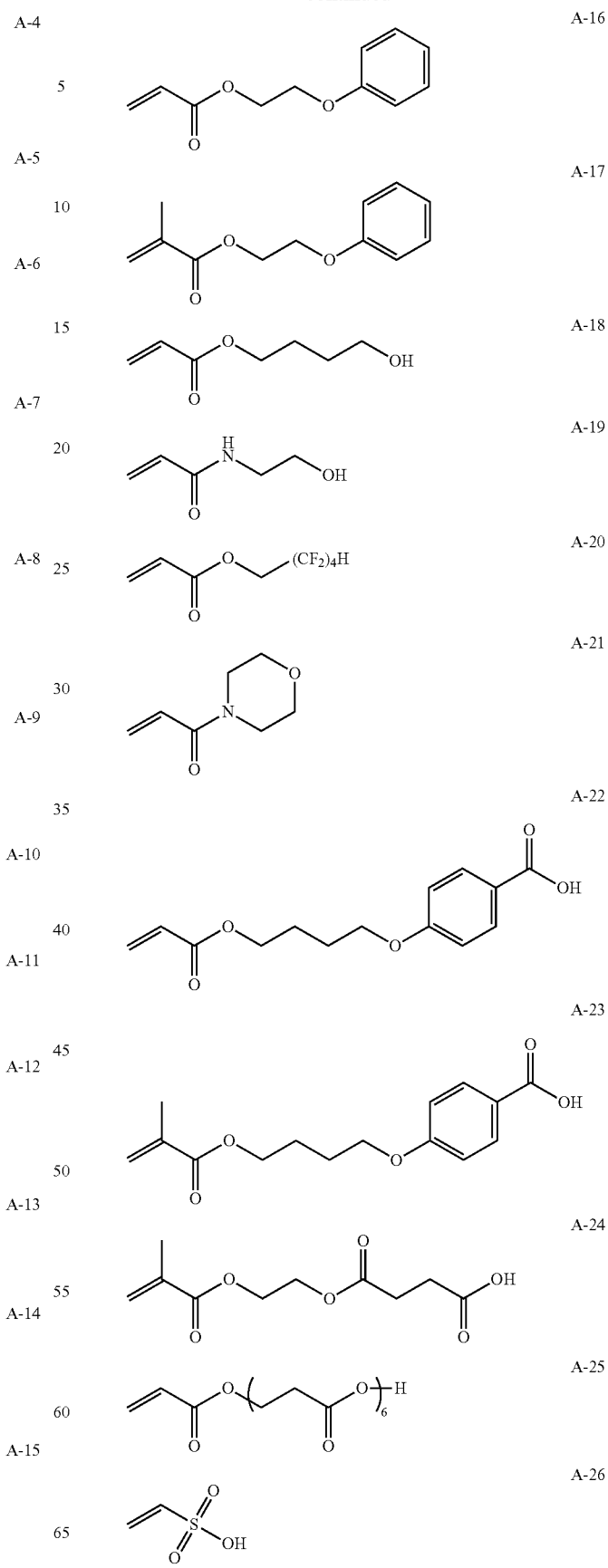

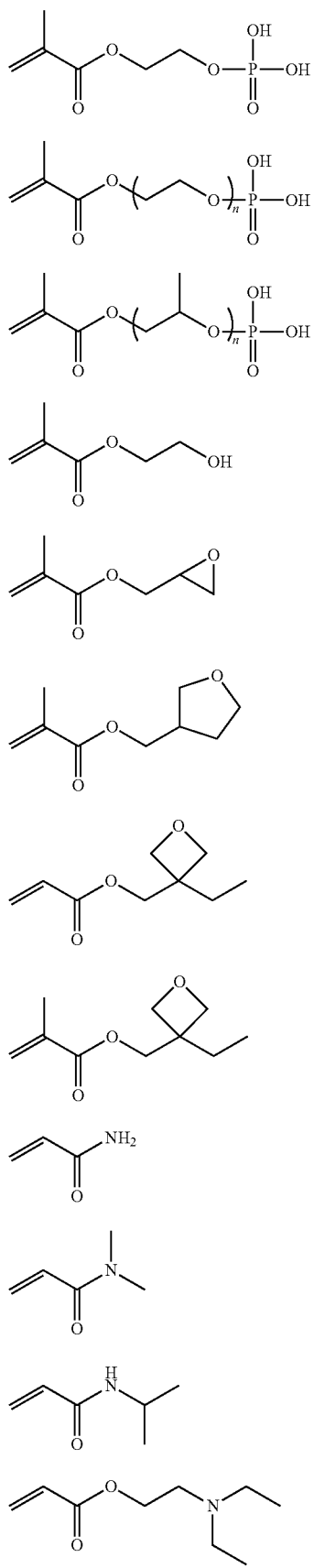
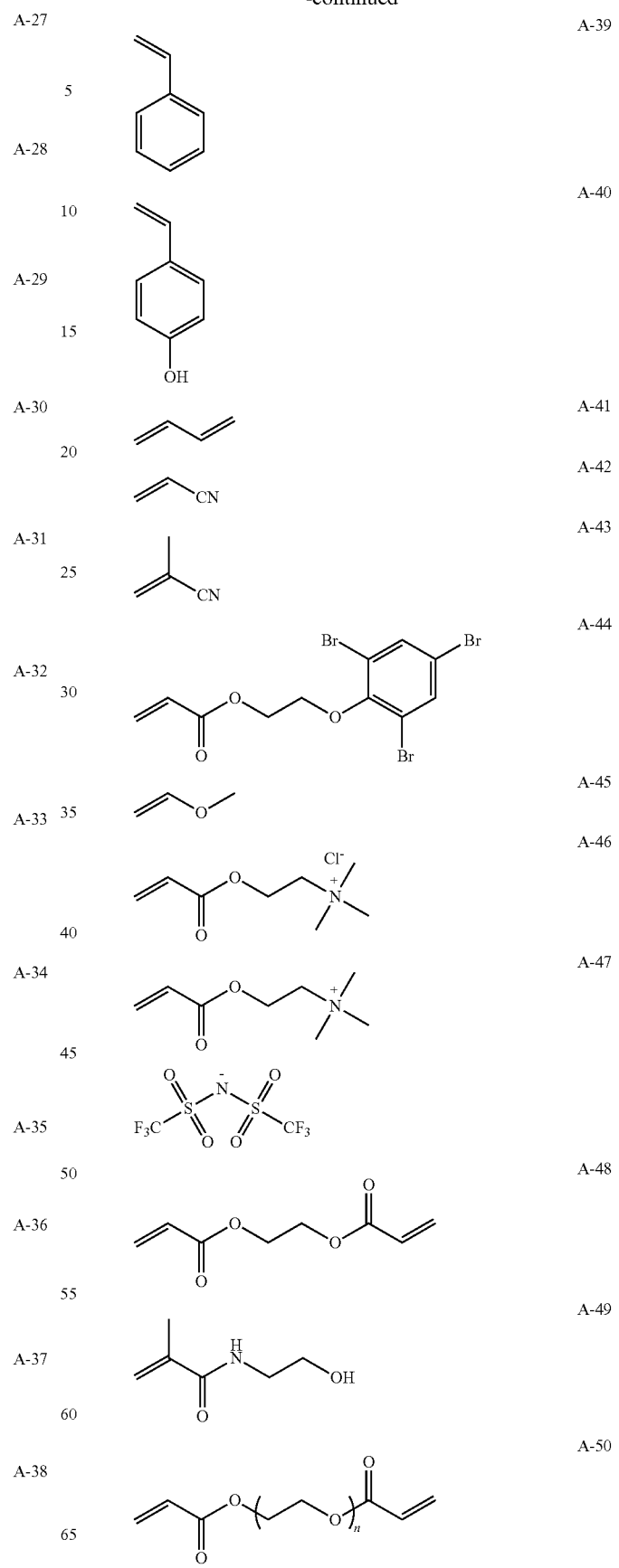

A-51
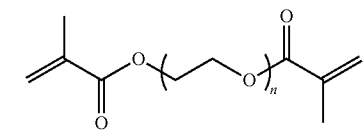
A-52
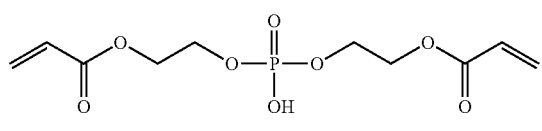
A-53
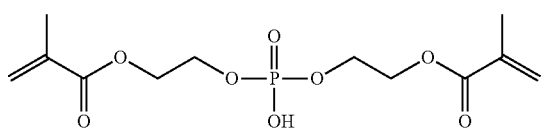
A-54
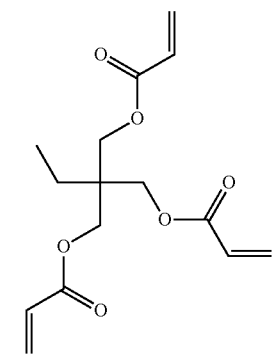
A-55
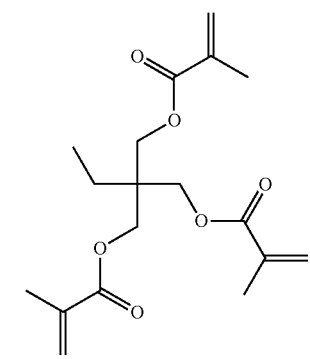
A-56
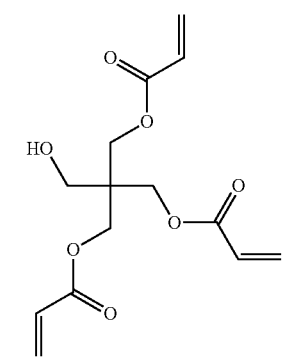
A-57
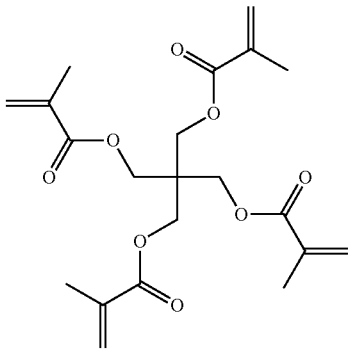
A-58
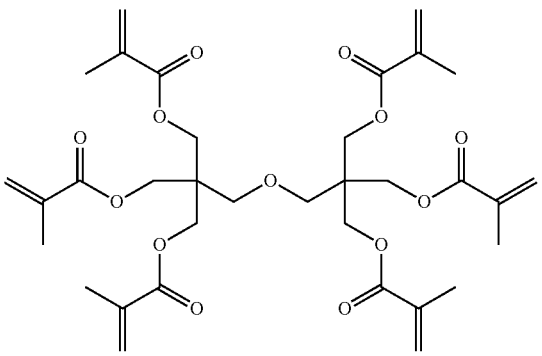
A-59
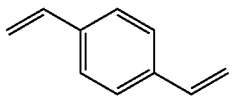
A-60
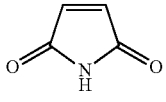
A-61
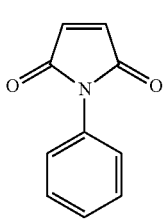
A-62
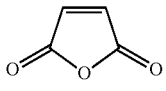
A-63
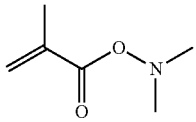
A-64
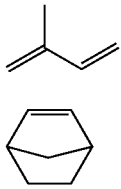
A-65

-continued

A-66 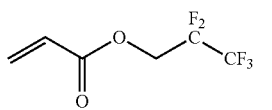

A-67 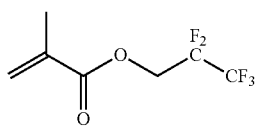

A-68 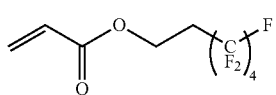

A-69 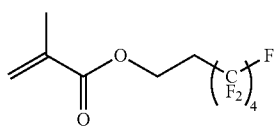

A-70 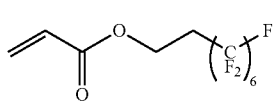

A-71 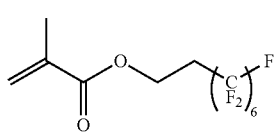

A-72 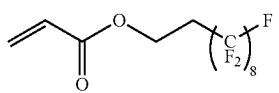

A-73 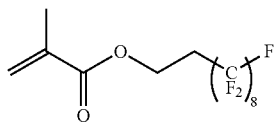

A-74 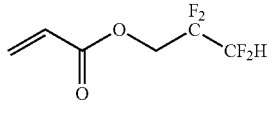

A-75 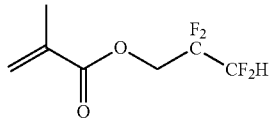

A-76 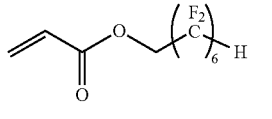

A-77 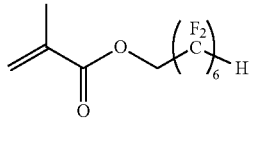

A-78 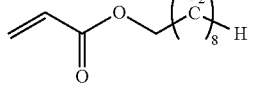

A-79 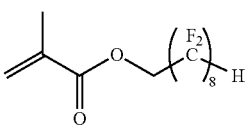

A-80 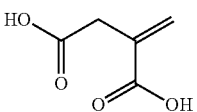

A-81 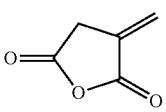

(ii) Polymer Having Partial Structure Represented by Formula (I)

The polymer forming the binder particles is also preferably a polymer (condensed body) having a partial structure represented by Formula (I).

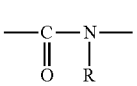

Formula (I)

In Formula (I), R represents a hydrogen atom or a monovalent organic group.

Examples of the polymer having the partial structure represented by Formula (I) include a polymer having an amide bond, a polymer having a urea bond, a polymer having an imide bond, a polymer having a urethane bond, and the like.

Examples of the organic group as R include an alkyl group, an alkenyl group, an aryl group, and a heteroaryl group. Among these, R is preferably a hydrogen atom.

Polymer Having Amide Bond

Examples of the polymer having an amide bond include polyamides and the like.

The polyamide can be obtained by the condensation polymerization of a diamine compound and a dicarboxylic acid compound or the ring-opening polymerization of lactam.

Examples of the diamine compound include aliphatic diamine compounds such as ethylenediamine, 1-methylethylenediamine, 1,3-propylenediamine, tetramethylenediamine, pentamethylenediamine, heptamethylenediamine, octamethylenediamine, nonamethylenediamine, decamethylenediamine, undecamethylenediamine, dodecamethylenediamine, cyclohexanediamine, and bis-(4,4'-aminohexyl)methane and aromatic diamines such as paraxylylenediamine and 2,2-bis(4-aminophenyl)hexafluoropropane. In addition, as a commercially available product of a diamine having a polypropyleneoxy chain, it is possible to use "JEFFAMINE" series (trade name, manufactured by Huntsman Corporation and Mitsui Fine Chemicals, Inc.). Examples of "JEFFAMINE" series include JEFFAMINE D-230, JEFFAMINE D-400, JEFFAMINE D-2000, JEFFAMINE XTJ-510, JEFFAMINE XTJ-500, JEFFAMINE XTJ-501, JEFFAMINE XTJ-502, JEFFAMINE HK-511, JEFFAMINE EDR-148, JEFFAMINE XTJ-512, JEFFAMINE XTJ-542, JEFFAMINE XTJ-533, JEFFAMINE XTJ-536, and the like.

Examples of the dicarboxylic acid compound include aliphatic dicarboxylic acids such as phthalic acid, malonic acid, succinic acid, glutaric acid, sebacic acid, pimelic acid, suberic acid, azelaic acid, undecanoic acid, undecadionic acid, dodecadioic acid, dimer acid, and 1,4-cyclohexanedicarboxylic acid and aromatic dicarboxylic acids such as paraxylylene dicarboxylic acid, methxylylene dicarboxylic acid, 2,6-naphthalene dicarboxylic acid, and 4,4'-diphenyldicarboxylic acid.

The number of each of the diamine compounds and the dicarboxylic acid compounds that can be used is one or more. In addition, in the polyamide, the combination of the diamine compound and the dicarboxylic acid compound is not particularly limited.

The lactam is not particularly limited, and it is possible to use ordinary lactam that forms the polyamide without any particular limitations.

Polymer Having Urea Bond

Examples of the polymer having a urea bond include polyurea. The polyurea can be synthesized by condensation-polymerizing a diisocyanate compound and a diamine compound in the presence of an amine catalyst.

Specific examples of the diisocyanate compound are not particularly limited, can be appropriately selected depending on the purpose, and include aromatic diisocyanate compounds such as 2,4-tolylene diisocyanate, dimers of 2,4-tolylene diisocyanate, 2,6-tolylene diisocyanate, p-xylylene diisocyanate, m-xylylene diisocyanate, 4,4'-diphenylmethane diisocyanate (MDI), 1,5-naphthylene diisocyanate, and 3,3'-dimethylbiphenyl-4,4'-diisocyanate; aliphatic diisocyanate compounds such as hexamethylene diisocyanate, trimethylhexamethylene diisocyanate, lysine diisocyanate, and dimer acid diisocyanate; alicyclic diisocyanate compounds such as isophorone diisocyanate, 4,4'-methylene bis(cyclohexyl isocyanate), methylcyclohexane-2,4 (or 2,6)-diyl diisocyanate, and 1,3-(isocyanatomethyl) cyclohexane; diisocyanate compounds that are reaction products of a diol and a diisocyanate such as an adduct of 1 mol of 1,3-butylene glycol and 2 mol of tolyene diisocyanate; and the like. Among these, 4,4'-diphenylmethane diisocyanate (MDI) and 4,4'-methylene bis(cyclohexyl isocyanate) are preferred.

Specific examples of the diamine compound include the above-described examples of the compound and the like.

The number of each of the diisocyanate compounds and the diamine compounds that can be used is one or more. In addition, in the polyurea, the combination of the diisocyanate compound and the diamine compound is not particularly limited.

Polymer Having Imide Bond

Examples of the polymer having an imide bond include polyimides. The polyimide can be obtained by causing an addition reaction between tetracarboxylic dianhydride and a diamine compound so as to form a polyamic acid and then opening the ring.

Specific examples of the tetracarboxylic dianhydride include 3,3',4,4'-biphenyltetracarboxylic dianhydride (s-BPDA) and pyromellitic dianhydride (PMDA), 2,3,3',4'-biphenyltetracarboxylic dianhydride (A-BPDA), oxydiphthalic dianhydride, diphenylsulfone-3,4,3',4'-tetracarboxylic dianhydride, bis(3,4-dicarboxyphenyl) sulfide dianhydride, 2,2-bis(3,4-dicarboxyphenyl)-1,1,1,3,3,3-hexafluoropropanediamine, 2,3,3',4'-benzophenonetetracarboxylic dianhydride, 3,3',4,4'-benzophenonetetracarboxylic dianhydride, bis(3,4-dicarboxyphenyl)methane dianhydride, 2,2-bis(3,4-dicarboxyphenyl)propane dianhydride, p-phenylene bis (trimellitic acid monoester anhydride), p-biphenylene bis (trimellitic acid monoester anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy) benzene dianhydride, 1,4-bis(3,4-dicarboxyphenoxy) benzene dianhydride, 1,4-bis(3,4-dicarboxyphenoxy) biphenyl anhydride, 2,2-bis[(3,4-dicarboxyphenoxy)phenyl] propane dianhydride, 2,3,6,7-naphthalenetetracarboxylic dianhydride, 1,4,5,8-naphthalenetetracarboxylic dianhydride, 4,4'-(2,2-hexafluoroisopropylidene)diphthalic dianhydride, and the like. The tetracarboxylic dianhydride may be used singly or two or more tetracarboxylic dianhydrides may be used in mixture.

The polyimide preferably includes, as the tetracarboxylic acid component, at least one of s-BPDA and PMDA, and, for example, the content of s-BPDA is preferably 50 mol % or more, more preferably 70 mol % or more, and particularly preferably 75 mol % or more with respect to 100 mol % of the tetracarboxylic acid component. The tetracarboxylic dianhydride preferably has a rigid benzene ring.

Specific examples of the diamine compound include the above-described examples of the compound and the like. The diamine compound is preferably a structure having amino groups at both terminals of a polyethylene oxide chain, a polypropylene oxide chain, a polycarbonate chain, or a polyester chain.

The number of each of the tetracarboxylic dianhydrides and the diamine compounds that can be used is one or more. In addition, in the polyimide, the combination of the tetracarboxylic dianhydride, and the diamine compound is not particularly limited.

Polymer Having Urethane Bond

Examples of the polymer having a urethane bond include polyurethane. The polyurethane can be obtained by the condensation polymerization of a diisocyanate compound and a diol compound in the presence of titanium, tin, and a bismuth catalyst.

Examples of the diisocyanate compound include the above-described examples of the compound.

Specific examples of the diol compound include ethylene glycol, diethylene glycol, triethylene glycol, tetraethylene glycol, propylene glycol, dipropylene glycol, polyethylene glycol (for example, polyethylene glycol having an average molecular weight of 200, 400, 600, 1,000, 1,500, 2,000, 3,000, or 7,500), polypropylene glycol (for example, polypropylene glycol having an average molecular weight of 400, 700, 1,000, 2,000, 3,000, or 4,000), neopentyl glycol, 1,3-butylene glycol, 1,4-butanediol, 1,3-butanediol, 1,6-hexanediol, 2-butene-1,4-diol, 2,2,4-trimethyl-1,3-pentanediol, 1,4-bis-β-hydroxyethoxycyclohexane, cyclohexanedimethanol, tricyclodecanedimethanol, hydrogenated bisphenol A, hydrogenated bisphenol F, ethylene oxide adducts of bisphenol A, propylene oxide adducts of bisphenol A, ethylene oxide adducts of bisphenol F, propylene oxide adducts of bisphenol F, and the like. The diol compound can be procured from commercially available products, and examples thereof include a polyether diol compound, a polyester diol compound, a polycarbonate diol compound, a polyalkylene diol compound, and a silicone diol compound.

The diol compound preferably has at least one of a poly(meth)acrylatic acid ester chain, a polyethylene oxide chain, a polypropylene oxide chain, a polycarbonate chain, a polyester chain, a polybutadiene chain, a polyisoprene chain, a polyalkylene chain, and a silicone chain. In addition, from the viewpoint of the improvement of the adsorption property to sulfide-based inorganic solid electrolyte or active materials, the diol compound preferably has a carbon-carbon unsaturated bond or a polar group (an alcoholic hydroxyl group, a phenolic hydroxyl group, a thiol group, a carboxy group, a sulfonic acid group, a sulfonamide group, a phosphoric acid group, a nitrile group, an amino group, a zwitter ion-containing group, a metal hydroxide, or a metal alkoxide). As the diol compound, it is possible to use 2,2-bis(hydroxymethyl)propionate. As a commercially available product of the diol compound having a carbon-carbon unsaturated bond, it is possible to preferably use BLEMMER GLM (manufactured by NOF Corporation) and the compound described in JP2007-187836A.

In the case of the polyurethane, as a polymerization terminator, it is possible to use a monoalcohol or a mono amine. The polymerization terminator is introduced into the terminal portion of a polyurethane main chain. As a method for introducing a soft segment into a polyurethane terminal, it is possible to use polyalkylene glycol monoalkyl ether (preferably polyethylene glycol monoalkyl ether or polypropylene monoalkyl ether), polycarbonate diol monoalkyl ether, polyester diol monoalkyl ether, polyester monoalcohol, or the like.

In addition, in a case in which a monoalcohol or monoamine having a polar group or a carbon-carbon unsaturated bond is used, it is possible to introduce the polar group or the carbon-carbon unsaturated bond into a terminal of the polyurethane main chain. Examples thereof include hydroxyacetic acid, hydroxypropionic acid, 4-hydroxybenzyl alcohol, 3-mercapto-1-propanol, 2,3-dimercapto-1-propanol, 3-mercapto-1-hexanol, 3-hydroxypropanesulfonic acid, 2-cyanoethanol, 3-hydroxyglutaronitrile, 2-aminoethanol, 2-hydroxyethyl methacrylate, 2-hydroxyethyl acrylate, N-methacrylylene diamine, and the like.

The number of each of the diisocyanate compounds, the diol compounds, and the polymerization terminators that can be used is one or more.

In addition, in the polyurethane, the combination of the diisocyanate compound and the diol compound is not particularly limited.

In the present invention, as described above, the polymer has one or more repeating units or partial structures derived from a compound (condensation component) forming the polymer. The structure of the repeating unit (hereinafter, the repeating unit includes a partial structure unless particularly otherwise described) is not particularly limited. In addition, in a case in which the polymer has two or more repeating units, the mass ratio of the repeating units is not particularly limited. From the viewpoint of the bonding property, the polymer preferably includes a repeating unit derived from a monomer having an SP value of 10.5 $(\text{cal}^{1/2}\,\text{cm}^{-3/2})$ or more or a partial structure derived from a condensation component having an SP value of 10.5 $(\text{cal}^{1/2}\,\text{cm}^{-3/2})$ or more, more preferably includes a repeating unit derived from a monomer having an SP value of more than 11 $(\text{cal}^{1/2}\,\text{cm}^{-3/2})$ (hereinafter, the monomer includes a condensation component), and still more preferably includes a repeating unit derived from a monomer having an SP value of 12 $(\text{cal}^{1/2}\,\text{cm}^{-3/2})$ or more. The content of the above-described repeating unit derived from a monomer having an SP value of 10.5 $(\text{cal}^{1/2}\,\text{cm}^{-3/2})$ or more in the polymer is preferably 10% by mass or more, more preferably 12% to 80% by mass, still more preferably 14% to 70% by mass, and particularly preferably 15% to 60% by mass of the mass of the entire polymer. In a case in which the polymer has a specific monomer at a specific ratio, it is possible to enhance the dispersibility of the solid electrolyte composition and, furthermore, enhance the bonding property.

Here, unless particularly otherwise described, as the SP value of the repeating unit, a value obtained using the Hoy method (H. L. Hoy Journal of Painting, 1970, Vol. 42, 76-118) is used.

The monomer having an SP value of 10.5 $(\text{cal}^{1/2}\,\text{cm}^{-3/2})$ or more is not particularly limited, and examples thereof include the acrylic monomer, dihydroxy compounds (diol compounds), diamino compounds, dicarboxy compounds, diisocyanate compounds, tetracarboxylic dianhydride-containing compounds, vinyl-based monomers, and the like.

The monomer having an SP value of 10.5 $(\text{cal}^{1/2}\,\text{cm}^{-3/2})$ or more, specifically, more preferably includes at least one of monomers represented by Formulae (a-11) to (a-15). The number of the monomers represented by Formulae (a-11) to (a-15) may be one or more.

(a-11)

(a-12)

(a-13)

(a-14)

(a-15)

In the formulae, $R^{21}$ represents a hydrogen atom, a hydroxy group, a cyano group, a halogen atom, or an alkyl group. The alkyl group that can be used as $R^{21}$ is the same as the alkyl group as $R^{11}$. Among them, a methyl group is particularly preferred. The halogen atom that can be used as $R^{21}$ is the same as the halogen atom as $R^{11}$. Among them, $R^{21}$ is preferably a hydrogen atom or an alkyl group and more particularly preferably a hydrogen atom or a methyl group.

$R^{22}$ represents a hydrogen atom or a substituent. Examples of the substituent include the substituent Z described below. A preferred aspect thereof is the same as that of $R^{12}$. Among these, a hydrogen atom, an alkyl group, a cyano group, a phenyl group, a carboxy group, a hydroxy group, a sulfonic acid group, a phosphoric acid group, an aliphatic heterocyclic group containing an oxygen atom, an amino group, and an ammonium group are preferred, a hydrogen atom, an alkyl group, a carboxy group, a phosphoric acid group, a hydroxy group, an amino group, and an ammonium group are more preferred, and a hydrogen atom, an alkyl group, a carboxy group, a phosphoric acid group, a hydroxy group, and an ammonium group are particularly preferred.

$R^{23}$ and $R^{24}$ each are the same as $R^{14}$. Among these, a hydrogen atom, methyl, and ethyl are particularly preferred.

A linking group $L^{21}$ is the same as $L^{11}$. Among these, a single bond, an alkylene group having 1 to 4 carbon atoms and preferably having 1 to 3 carbon atoms, a carbonyl group, an ether group, an imino group, and a linking group made of a combination thereof are particularly preferred.

Linking groups $L^{22}$ and $L^{23}$ are the same as $L^{11}$. Among these, a single bond, an alkylene group having 1 to 4 carbon atoms, a carbonyl group, an ether group, an imino group, and a linking group made of a combination thereof are particularly preferred.

X is the same as X described above.

Hereinafter, examples of the monomer having an SP value of 10.5 ($cal^{1/2}$ $cm^{-3/2}$) or more and preferably more than 11 ($cal^{1/2}$ $cm^{-3/2}$) will be illustrated together with an SP value ($cal^{1/2}$ $cm^{-3/2}$). In addition, monomers having an SP value of 10.5 ($cal^{1/2}$ $cm^{-3/2}$) or more are also included in the examples of the acrylic monomer and the vinyl-based monomer. Furthermore, the condensation component having an SP value of 10.5 ($cal^{1/2}$ $cm^{-3/2}$) or more are also included in the examples of the respective compounds described in the section of the polymer having the partial structure represented by Formula (I). Regarding the monomer and the condensation component having an SP value of 10.5 ($cal^{1/2}$ $cm^{-3/2}$) or more, the present invention is not limited to monomers and condensation components exemplified below. Among the following formulae, n represents an integer of 1 to 30.

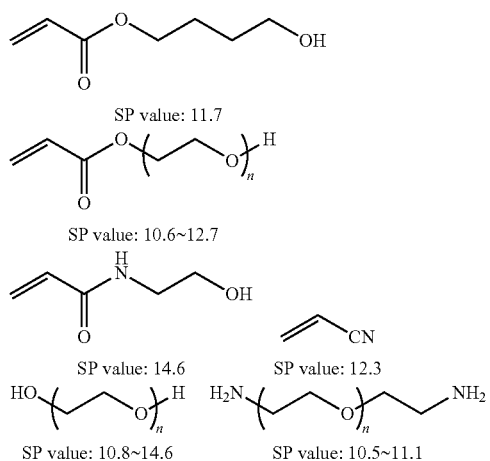

The polymer forming the binder particles preferably has a hydroxy group or an amide group (a carbamoyl group-$CONR_2$:R represents a hydrogen atom or a substituent (preferably represents an alkyl group, an ester group, or an ether group)). The hydroxy group and the carbamoyl group may be included in the main chain or may be included in a side chain described below, but are preferably included in the side chain. As described above, in a case in which the polymer includes a specific group in the side chain, the affinity (wettability) to sulfide-based inorganic solid electrolytes further improves, and a more favorable bonding property and a more favorable ion conductivity can be realized.

The polymer forming the binder particles preferably has, as the side chain component, a repeating unit derived from a macromonomer having a mass-average molecular weight of 1,000 or more. The macromonomer is not particularly limited, and it is possible to preferably use the macromonomers described in Paragraphs "0043" to "0066" of JP2015-88486A, the content of which is preferably incorporated into the present specification.

In the present invention, the mass-average molecular weight of the macromonomer is more preferably 2,000 or more and particularly preferably 3,000 or more. The upper limit is preferably 500,000 or less, more preferably 100,000 or less, and particularly preferably 30,000 or less.

In addition, the content of the macromonomer in the polymer is preferably 10% to 50% by mass and more preferably 20% to 40% by mass of the total mass of the polymer.

The expression of a compound in the present specification (for example, a case in which a substance is called with 'compound' at the end) indicates not only the compound but also salts thereof and ions thereof. In addition, the expression also indicates derivatives obtained by partially changing the compound, for example, introducing a substituent into the compound without impairing desired effects.

The expression of a substituent that is not clearly expressed as substituted or unsubstituted in the present specification (which is also true for a linking group) means that the group may have an appropriate substituent. What has been described above is also true for compounds that are not clearly expressed as substituted or unsubstituted. Examples of the preferred substituent include the substituent Z described below.

In addition, in the present specification, in the case of being simply expressed as a YYY group, the YYY group is selected from the following substituent Z that corresponds to the group.

Examples of the substituent Z include substituents described below.

Examples thereof include an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, 1-carboxymethyl, or the like), an alkenyl group (preferably an alkenyl group having 2 to 20 carbon atoms, for example, vinyl, allyl, olefin, or the like), an alkynyl group (preferably an alkynyl group having 2 to 20 carbon atoms, for example, ethynyl, butadiynyl, phenylethynyl, or the like), a cycloalkyl group (preferably a cycloalkyl group having 3 to 20 carbon atoms, for example, cyclopropyl, cyclopentyl, cyclohexyl, 4-methylcyclohexyl, or the like; here, an alkyl group mentioned in the present specification, generally, also refers to a cycloalkyl group), an aryl group (preferably an aryl group having 6 to 26 carbon atoms, for example, phenyl, 1-naphthyl, 4-methoxyphenyl, 2-chlorophenyl, 3-methylphenyl, or the like), an aralkyl group (preferably an aralkyl group having 7 to 23 carbon atoms, for example, benzyl, phenethyl, or the like), a heterocyclic group (preferably a heterocyclic group having 2 to 20 carbon atoms, more preferably a 5- or 6-membered heterocyclic group having at least one of an oxygen atom, a sulfur atom, and a nitrogen atom, for example, tetrahydropyran, tetrahydrofuran, 2-pyridyl, 4-pyridyl, 2-imidazolyl, 2-benzimidazolyl, 2-thiazolyl, 2-oxazolyl, a pyrrolidone group, or the like), an alkoxy group (preferably an alkoxy group having 1 to 20 carbon atoms, for example, methoxy, ethoxy, isopropyloxy, benzyloxy, or the like), an aryloxy group (preferably an aryloxy group having 6 to 26 carbon atoms, for example, phenoxy, 1-naphthyloxy, 3-methylphenoxy, 4-methoxyphenoxy, or the like; here, an alkoxy group mentioned in the present specification, generally, also refers to an aryloxy group), an alkoxycarbonyl group (preferably an alkoxycarbonyl group having 2 to 20 carbon atoms, for example, ethoxycarbonyl, 2-ethylhexyloxycarbonyl, or the like), an aryloxycarbonyl group (preferably an aryloxycarbonyl group having 6 to 26 carbon atoms, for example, phenoxycarbonyl, 1-naphthyloxycarbonyl, 3-methyl phenoxycarbonyl, 4-methoxy phenoxycarbonyl, or the like), an amino group (preferably an amino group having 0 to 20 carbon atoms, including an alkylamino group and an arylamino group, for example, amino, N,N-dimethylamino, N,N-diethylamino, N-ethylamino, aniline, or the like), a sulfamoyl group (preferably a sulfamoyl group having 0 to 20 carbon atoms, for example, N,N-dimethylsulfamoyl, N-phenylsulfamoyl, or the like), an acyl group (preferably an acyl group having 1 to 20 carbon atoms, for example, acetyl, propionyl, butyryl, or the like), an aryloyl group (preferably an aryloyl group having 7 to 23 carbon atoms, for example, benzoyl or the like; here, an acyl group mentioned in the present specification, generally, also refers to an aryloyl group), an acyloxy group (preferably an acyloxy group having 1 to 20 carbon atoms, for example, acetyloxy or the like), an aryloyloxy group (preferably an aryloyloxy group having 7 to 23 carbon atoms, for example, benzoyloxy or the like; here, an acyloxy group mentioned in the present specification, generally, also refers to an aryloyloxy group), a carbamoyl group (preferably a carbamoyl group having 1 to 20 carbon atoms, for example, N,N-dimethylcarbamoyl, N-phenylcarbamoyl, or the like), an acylamino group (preferably an acylamino group having 1 to 20 carbon atoms, for example, acetylamino, benzoylamino, or the like), an alkylthio group (preferably an alkylthio group having 1 to 20 carbon atoms, for example, methylthio, ethylthio, isopropylthio, benzylthio, or the like), an arylthio group (preferably an arylthio group having 6 to 26 carbon atoms, for example, phenylthio, 1-naphthylthio, 3-methylphenylthio, 4-methoxyphenylthio, or the like), an alkylsulfonyl group (preferably an alkylsulfonyl group having 1 to 20 carbon atoms, for example, methylsulfonyl, ethylsulfonyl, or the like), an arylsulfonyl group (preferably an arylsulfonyl group having 6 to 22 carbon atoms, for example, benzenesulfonyl or the like), an alkylsilyl group (preferably an alkylsilyl group having 1 to 20 carbon atoms, for example, monomethylsilyl, dimethylsilyl, trimethylsilyl, triethylsilyl, or the like), an arylsilyl group (preferably an arylsilyl group having 6 to 42 carbon atoms, for example, triphenylsilyl or the like), an alkoxysilyl group (preferably an alkoxysilyl group having 1 to 20 carbon atoms, for example, monomethoxysilyl, dimethoxysilyl, trimethoxysilyl, triethoxysilyl, or the like), an aryloxysilyl group (preferably an aryloxysilyl group having 6 to 42 carbon atoms, for example, triphenyloxysilyl or the like), a phosphoryl group (preferably a phosphoryl group having 0 to 20 carbon atoms, for example, —OP(=O)($R^P$)$_2$), a phosphonyl group (preferably a phosphonyl group having 0 to 20 carbon atoms, for example, —P(=O)($R^P$)$_2$), a phosphinyl group (preferably a phosphinyl group having 0 to 20 carbon atoms, for example, —P($R^P$)$_2$), a (meth)acryloyl group, a (meth)acryloyloxy group, a (meth)acryloylimino group (a (meth)acrylamide group), a hydroxy group, a thiol group, a carboxy group, a phosphoric acid group, a phosphonic acid group, a sulfonic acid group, a cyano group, and a halogen atom (for example, a fluorine atom, a chlorine atom, a bromine atom, an iodine atom, or the like).

In addition, in each of the groups exemplified as the substituent Z, the substituent Z may be further substituted.

$R^P$ is a hydrogen atom, a hydroxyl group, or a substituent. The substituent is preferably an alkyl group (preferably having 1 to 24 carbon atoms, more preferably having 1 to 12 carbon atoms, still more preferably having 1 to 6 carbon atoms, and particularly preferably having 1 to 3 carbon atoms), an alkenyl group (preferably having 2 to 24 carbon atoms, more preferably having 2 to 12 carbon atoms, still more preferably having 2 to 6 carbon atoms, and particularly preferably having 2 or 3 carbon atoms), an alkynyl group (preferably having 2 to 24 carbon atoms, more preferably having 2 to 12 carbon atoms, still more preferably having 2 to 6 carbon atoms, and particularly preferably having 2 or 3 carbon atoms), an aralkyl group (preferably having 7 to 22 carbon atoms, more preferably having 7 to 14 carbon atoms, and particularly preferably having 7 to 10 carbon atoms), an aryl group (preferably having 6 to 22 carbon atoms, more preferably having 6 to 14 carbon atoms, and particularly preferably having 6 to 10 carbon atoms), an alkoxy group (preferably having 1 to 24 carbon atoms, more preferably having 1 to 12 carbon atoms, still more preferably having 1 to 6 carbon atoms, and particularly preferably having 1 to 3 carbon atoms), an alkenyloxy group (preferably having 2 to 24 carbon atoms, more preferably having 2 to 12 carbon atoms, still more preferably having 2 to 6 carbon atoms, and particularly preferably having 2 or 3 carbon atoms), an alkynyloxy group (preferably having 2 to 24 carbon atoms, more preferably having 2 to 12 carbon atoms, still more preferably having 2 to 6 carbon atoms, and particularly preferably having 2 or 3 carbon atoms), an aralkyloxy group (preferably having 7 to 22 carbon atoms, more preferably having 7 to 14 carbon atoms, and particularly preferably having 7 to 10 carbon atoms), or an aryloxy group (preferably having 6 to 22 carbon atoms, more preferably having 6 to 14 carbon atoms, and particularly preferably having 6 to 10).

In a case in which the compound, the substituent, the linking group, or the like includes an alkyl group, an alkylene group, an alkenyl group, an alkenylene group, an alkynyl group, an alkynylene group, or the like, this group may have a circular shape or a chain shape, may be a straight chain or branched, and may be substituted or unsubstituted as described above.

In the binder particles, the mass ratio between the ion-conductive substance and the polymer is not particularly limited as long as the ion-conductive substance can be encompassed in the polymer, but is preferably 1:1 to 10, more preferably 1:1.5 to 8, and still more preferably 1:2 to 5 (the ion-conductive substance to the polymer).

The polymer constituting the binder particles is preferably amorphous. In the present invention, the polymer "being amorphous" typically refers to a polymer in which no endothermic peak attributed to crystal melting is observed in the case of being measured using a method for measuring the glass transition temperature (Tg) described below. The Tg of the polymer is preferably 50° C. or lower, more preferably 30° C. or lower, still more preferably 20° C. or lower, and particularly preferably 10° C. or lower. The lower limit value is preferably −80° C. or higher, more preferably −60° C. or higher, still more preferably −50° C. or higher, and particularly preferably −40° C. or higher.

The glass transition temperature (Tg) is measured using a dried specimen of the binder particles and a differential scanning calorimeter: X-DSC7000 (trade name, manufactured by SII•NanoTechnology Inc.) under the following conditions. The glass transition temperature of the same specimen is measured twice, and the measurement result of the second measurement is employed.

Atmosphere in the measurement chamber: Nitrogen gas (50 mL/min)
Temperature-increase rate: 5° C./min
Measurement-start temperature: −100° C.
Measurement-end temperature: 200° C.
Specimen pan: Aluminum pan
Mass of the measurement specimen: 5 mg Calculation of Tg: Tg is calculated by rounding off the middle temperature between the declination-start point and the declination-end point in the DSC chart to the integer.

Meanwhile, in a case in which an all-solid state secondary battery is used, for example, the all-solid state secondary battery is dissembled, the active material layer or the solid electrolyte layer is immersed in water so as to disperse the materials, then, filtering is carried out, the remaining solid is collected, and the glass transition temperature is measured using the above-described measurement method.

The mass-average molecular weight of the polymer forming the binder particles is preferably 5,000 or more, more preferably 10,000 or more, and still more preferably 30,000 or more. The upper limit is practically 1,000,000 or less, but a crosslinked aspect is also preferred.

Measurement of Molecular Weight

In the present invention, unless particularly otherwise described, the molecular weight of the polymer refers to the mass-average molecular weight, and the standard polystyrene-equivalent mass-average molecular weight is measured by means of gel permeation chromatography (GPC). Regarding the measurement method, basically, a value measured using a method under the following condition 1 or 2 (preferential) is used. Here, an appropriate eluent may be appropriately selected and used depending on the kind of the polymer.

(Condition 1)

Column: Two TOSOH TSKgel Super AWM-H are connected together

Carrier: 10 mM LiBr/N-methylpyrrolidone

Measurement temperature: 40° C.

Carrier flow rate: 1.0 mL/min

Specimen concentration: 0.1% by mass

Detector: Refractive index (RI) detector (Condition 2) (preferential)

Column: A column obtained by connecting TOSOH TSKgel Super HZM-H, TOSOH TSKgel Super HZ4000, and TOSOH TSKgel Super HZ 2000 is used Carrier: Tetrahydrofuran Measurement temperature: 40° C.

Carrier flow rate: 1.0 mL/min

Specimen concentration: 0.1% by mass

Detector: Refractive index (RI) detector

In a case in which the polymer is crosslinked by heating or the application of voltage, the molecular weight may be greater than the above-described molecular weight. The mass-average molecular weight of the polymer forming the binder particles is preferably in the above-described range at the time of initiating the use of the all-solid state secondary battery.

The polymer constituting the binder particles that are used in the present invention preferably has a moisture concentration of 100 ppm or less (mass-based).

In addition, the polymer constituting the binder particles that are used in the present invention may be dried by being crystallized or may be used in a polymer solution form. The amount of a metal-based catalyst (a urethanization or polyesterification catalyst=tin, titanium, or bismuth) is preferably small. The concentration of metal in copolymers is preferably set to 100 ppm or less (mass-based) by decreasing the amount of the metal during polymerization or removing the catalyst by means of crystallization.

The binder particles can be manufactured using a method capable of producing particles in which the ion-conductive substance is encompassed in the polymer. Examples thereof include a method in which the ion-conductive substance is injected into the binder particles, a method in which the binder particles are formed by means of polymerization in the presence of the ion-conductive substance, a method in which the ion-conductive substance and the polymer are mixed together so as to form particles, and the like.

The method of polymerization in the presence of the ion-conductive substance is specifically a method in which the polymer forming the binder particles is synthesized (monomers are polymerized or condensed) in the presence of the ion-conductive substance according to an ordinary polymerization reaction, condensation reaction, or the like. According to this method, it is possible to obtain the binder particles in which the ion-conductive substance is encompassed in the polymer produced by polymerization or condensation. In the case of manufacturing the binder particles using this method, the encompassing state of the ion-conductive substance or the degree thereof (the coating ratio or the mass ratio) can be appropriately set in a predetermined range using the kind of a monomer, the amount of the monomer used, a polymerization solvent, the kind of the ion-conductive substance, the amount of the ion-conductive substance, and the like. In addition, the average particle diameter of the binder particles can be appropriately set in a predetermined range using a change of the kind of the monomer, the amount of a dispersion component, the polymerization temperature, the dropwise addition time, the dropwise addition method, and the like.

In addition, the method of producing particles by mixing the ion-conductive substance and the polymer is preferably a method in which the ion-conductive substance and the polymer are mixed together in a solvent that dissolves the ion-conductive substance and the polymer and are precipitated (co-precipitated), thereby producing particles. In this case, it is considered that the ion-conductive substance is injected and encompassed into the polymer during the precipitation of the polymer or the ion-conductive substance, thereby producing particles. Examples of the manufacturing conditions in this method include a condition in which the ion-conductive substance and the polymer are dissolved in a solvent, and a solvent that has a low affinity to the ion-conductive substance and does not dissolve the polymer is added dropwise to the obtained solution, thereby forming particles. In the case of manufacturing the binder particles using this method, the encompassing state of the ion-conductive substance or the degree thereof can be appropriately set in a predetermined range using the amount of the polymer used, the solvent that dissolves the ion-conductive substance and the polymer, the solvent that does not dissolve the polymer, the dropwise addition rate, the dropwise addition method, the kind of the ion-conductive substance, the amount of the ion-conductive substance, the kind of the polymer, the molecular weight of the polymer, and the like. The average particle diameter of the binder particles can be appropriately set in a predetermined range using the solvent that dissolves the ion-conductive substance and the polymer, the solvent that does not dissolve the polymer, the dropwise addition rate, the dropwise addition method, the kind of the ion-conductive substance, the amount of the ion-conductive substance, the kind of the polymer, the molecular weight of the polymer, the temperature, the dropwise addition time, the dropwise addition method, and the like.

In the present invention, the method in which monomers are polymerized or condensed in the presence of the ion-conductive substance, thereby synthesizing the binder particles is preferred.

The solvent that is used for the polymerization reaction or condensation reaction of the polymer is not particularly limited. Meanwhile, solvents that do not react with the inorganic solid electrolyte or the active materials and furthermore do not decompose the inorganic solid electrolyte or the active materials are preferably used. For example, it is possible to use hydrocarbon solvents (toluene, heptane, and xylene), ester solvents (ethyl acetate and propylene glycol monomethyl ether acetate), ether solvents (tetrahydrofuran, dioxane, and 1,2-diethoxyethane), ketone solvents (acetone, methyl ethyl ketone, and cyclohexanone), nitrile solvents (acetonitrile, propionitrile, butyronitrile, and isobutyronitrile), and halogen solvents (dichloromethane and chloroform).

In the present invention, one kind of the binder particles may be used singly or two or more kinds of the binder particles may be used in combination.

The content of the binder particles in the solid electrolyte composition is preferably 0.1% by mass or more, more preferably 0.3% by mass or more, and particularly preferably 1% by mass or more in the solid content. The upper limit is preferably 20% by mass or less, more preferably 10% by mass or less, and particularly preferably 5% by mass or less.

In a case in which the binder particles are used in the above-described range, it is possible to more efficiently realize both the fixing property of the solid electrolyte and the suppression of the interface resistance.

The mass ratio among the respective constituent components in the solid electrolyte composition is not particularly limited, but is preferably 100:0.01 to 20:0.1 to 40, more preferably 100:0.1 to 5:0.5 to 10, and particularly preferably 100:0.3 to 1:1 to 5 (the inorganic solid electrolyte:the ion-conductive substance (the ion-conductive substance forming the binder particles):the binder (the polymer forming the binder particles)).

(Dispersion Medium)

The solid electrolyte composition of the present invention contains a dispersion medium.

The dispersion medium needs to be capable of dispersing the respective components described above, and examples thereof include a variety of organic solvents. Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dialkyl ethers (dimethyl ether, diethyl ether, diisopropyl ether, dibutyl ether, and the like), and cyclic ethers (tetrahydrofuran, dioxane (including each of 1,2-, 1,3- and 1,4-isomers)).

Examples of amide compound solvents include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, decane, and the like.

Examples of nitrile compound solvents include acetonitrile, propionitrile, butyronitrile, and the like.

Examples of ester compound solvents include ethyl acetate, butyl acetate, propyl acetate, butyl butyrate, butyl pentanoate, and the like.

Examples of non-aqueous dispersion media include the aromatic compound solvents, the aliphatic compound solvents, and the like.

In the present invention, among these, the amino compound solvents, the ether compound solvents, the ketone compound solvents, the aromatic compound solvents, and the aliphatic compound solvents are preferred, and the ether compound solvents, the aromatic compound solvents, and the aliphatic compound solvents are more preferred. In the present invention, it is preferable to use a sulfide-based inorganic solid electrolyte and, furthermore, select a specific organic solvent described above. In the case of selecting this combination, the organic solvent does not include any functional groups that are active to the sulfide-based inorganic solid electrolyte, and thus the sulfide-based inorganic solid electrolyte is stably handled, which is preferable. Particularly, a combination of the sulfide-based inorganic solid electrolyte and the aliphatic compound solvent is preferred.

The CLog P value of the dispersion medium that is used in the present invention is preferably 1 or more, more preferably 1.5 or more, still more preferably 2 or more, and particularly preferably 2.5 or more. There is no particular upper limit, but the upper limit is practically 10 or less.

Examples of the above-described dispersion medium in the above-described dispersion media include toluene, xylylene, hexane, heptane, octane, acetone, methyl ethyl ketone (MEK), dibutyl ether, N-methyl-2-pyrrolidinone, ethyl acetate, butyl butylate, tetrahydrofuran, tributylamine, and the like. Among these, toluene, xylylene, hexane, heptane, dibutyl ether, and tributylamine are particularly preferred. In a case in which the Clog P value is set in the above-described range, the dispersion medium does not include any functional groups or has a hydrophobic substituent, and thus it is possible to stably handle the sulfide-based inorganic solid electrolyte without dissolving the sulfide-based inorganic solid electrolyte.

Hereinafter, the CLog P value of several dispersion media will be illustrated together with the chemical formulae.

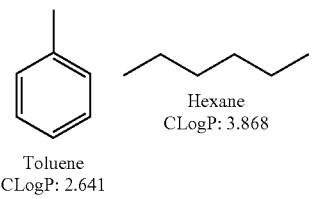

Toluene
CLogP: 2.641

Hexane
CLogP: 3.868

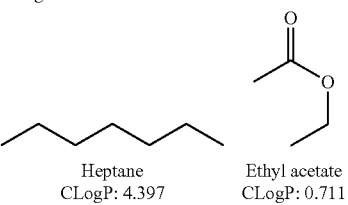

Heptane
CLogP: 4.397

Ethyl acetate
CLogP: 0.711

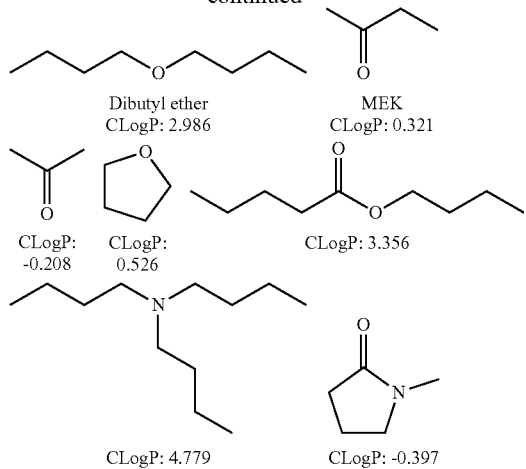

In the present invention, the Clog P value refers to a value of the common logarithm of the partition coefficient P into 1-octanol and water obtained by calculation. As a method or software for calculating the Clog P value, a well-known method or software can be used; however, unless particularly otherwise described, a value computed after the drawing of a structure using ChemDraw manufactured by PerkinElmer Co., Ltd.

The boiling point of the dispersion medium at normal pressure (one atmosphere) is preferably 50° C. or higher and more preferably 70° C. or higher. The upper limit is preferably 250° C. or lower and more preferably 220° C. or lower.

The dispersion medium may be used singly or two or more dispersion media may be used in combination.

In the present invention, the content of the dispersion medium in the solid electrolyte composition can be appropriately set in consideration of the balance between the viscosity of the solid electrolyte composition and the drying load. The content of the dispersion medium in the solid electrolyte composition is generally preferably 20% to 99% by mass, more preferably 30% to 85% by mass, and particularly preferably 40% to 80% by mass.

(Active Material)

The solid electrolyte composition of the present invention may contain an active material capable of intercalating and deintercalating ions of metal elements belonging to Group I or II of the periodic table. Examples of the active material include a positive electrode active material and a negative electrode active material which will be described below, and a transition metal oxide that is a positive electrode active material or a metal oxide that is a negative electrode active material is preferred.

In the present invention, the solid electrolyte composition containing an active material (a positive electrode active material or a negative electrode active material) will be referred to as a composition for an electrode layer (a composition for a positive electrode or a composition for a negative electrode) in some cases.

Positive Electrode Active Material

A positive electrode active material that the solid electrolyte composition of the present invention may contain is preferably a positive electrode active material capable of reversibly intercalating and/or deintercalating lithium ions. The above-described material is not particularly limited as long as the material has the above-described characteristics and may be transition metal oxides, elements capable of being complexed with Li such as sulfur, or the like.

Among these, as the positive electrode active material, transition metal oxides are preferably used, and transition metal oxides having a transition metal element Ma (one or more elements selected from Co, Ni, Fe, Mn, Cu, and V) are more preferred. In addition, an element $M^b$ (an element of Group I (Ia) of the periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element Ma. The positive electrode active material is more preferably synthesized by mixing the element into the transition metal oxide so that the molar ratio of Li/Ma reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, and cobalt fluorophosphates such as $Li_2CoPO_4F$.

Examples of the lithium-containing transition metal silicon silicate compounds (ME) include $Li_2FeSiO_4$, $Li_2MnSiO_4$, $Li_2CoSiO_4$, and the like.

In the present invention, the transition metal oxides having a bedded salt-type structure (MA) are preferred, and LCO or NMC is more preferred.

The shape of the positive electrode active material is not particularly limited, but is preferably particulate. The volume-average particle diameter (circle-equivalent average particle diameter) of the positive electrode active material is not particularly limited. For example, it is possible to set the volume-average particle diameter to 0.1 to 50 µm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming the positive electrode active material layer, the mass (mg) of the positive electrode active material per unit area ($cm^2$) of the positive electrode active material layer (weight per unit area) is not particularly limited, and can be appropriately determined depending on the set battery capacity.

The content of the positive electrode active material in the solid electrolyte composition is not particularly limited, but is preferably 10% to 95% by mass, more preferably 30% to 90% by mass, still more preferably 50% to 85% by mass, and particularly preferably 70% to 80% by mass with respect to 100% by mass of the solid components in the composition for a positive electrode.

Negative Electrode Active Material

A negative electrode active material that the solid electrolyte composition of the present invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si, and In and the like. Among these, carbonaceous materials or lithium complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially made of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, planar graphite, and the like.

These carbonaceous materials can also be differentiated into non-graphitizable carbonaceous materials and graphite-based carbonaceous materials depending on the degree of graphitization. In addition, the carbonaceous material preferably has the surface separation or the density and the size of crystallites described in JP1987-22066A (JP-S62-22066A), JP1990-6856A (JP-H2-6856A), and JP1991-45473A (JP-H3-45473A). The carbonaceous material does not need to be the same material, and it is also possible to use a mixture of the natural graphite and the artificial graphite described in JP1993-90844A (JP-H5-90844A), graphite having the coating layer described in JP1994-4516A (JP-H6-4516A), and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries.

In the present invention, hard carbon or graphite is preferably used, and graphite is more preferably used. Meanwhile, in the present invention, the carbonaceous material may be used singly or two or more carbonaceous materials may be used in combination.

The shape of the negative electrode active material is not particularly limited, but is preferably particulate. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method or from the mass ratio of powder before and after firing as a convenient method.

Preferred examples of negative electrode active materials that can be jointly used with the amorphous oxide negative electrode active material mainly including Sn, Si, or Ge include carbon materials capable of adsorbing and/or emitting lithium ions or lithium metal, lithium, lithium alloys, and metal capable of forming an alloy with lithium.

In the present invention, a Si-based negative electrode is preferably applied. Generally, a Si negative electrode is capable of absorbing a larger number of Li ions than carbon negative electrodes (graphite, acetylene black, and the like). That is, the amount of Li ions absorbed per unit weight increases. Therefore, it is possible to increase the battery capacity. As a result, there is an advantage that the driving time of batteries can be extended.

The negative electrode active material may be used singly or two or more negative electrode active materials may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the set battery capacity.

The content of the negative electrode active material in the solid electrolyte composition is not particularly limited, but is preferably 10% to 80% by mass, more preferably 20% to 80% by mass, more preferably 30% to 80% by mass, and still more preferably 40% to 75% by mass with respect to 100% by mass of the solid components.

(Auxiliary Conductive Agent)

The solid electrolyte composition of the present invention may also appropriately contain an auxiliary conductive agent that is used to improve the electron conductivity of the active materials as necessary. As the auxiliary conductive agent, ordinary auxiliary conductive agents can be used. The auxiliary conductive agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene or may be metal powder or a metal fiber of copper, nickel, or the like, and a conductive polymer such as polyaniline, polypyrrole, polythiophene, polyacetylene, or a polyphenylene derivative may also be used. In addition, these auxiliary conductive agents may be used singly or two or more auxiliary conductive agents may be used.

In a case in which the solid electrolyte composition of the present invention includes the auxiliary conductive agent, the content of the auxiliary conductive agent in the solid electrolyte composition is preferably 0% to 10% by mass.

(Lithium Salt)

The solid electrolyte composition of the present invention preferably contains a lithium salt (supporting electrolyte).

The lithium salt is preferably a lithium salt that is ordinarily used in this kind of products and is not particularly limited. Examples thereof include the lithium salts described in the section of the binder particles.

This lithium salt is different from the lithium salt that is encompassed in the binder particles in terms of the fact that this lithium salt is not encompassed in the binder particles (the polymer forming the binder particles) (for example, this lithium salt is singly present in a solid electrolyte layer composition).

The content of the lithium salt is preferably 0 parts by mass or more and more preferably 5 parts by mass or more with respect to 100 parts by mass of the solid electrolyte. The upper limit is preferably 50 parts by mass or less and more preferably 20 parts by mass or less.

(Dispersant)

The solid electrolyte composition of the present invention may contain a dispersant. In a case in which the dispersant is added to the solid electrolyte composition, it is possible to suppress the agglomeration of the electrode active material or the inorganic solid electrolyte and form a uniform active material layer and a uniform solid electrolyte layer even in a case in which the concentration of any of the electrode active material and the inorganic solid electrolyte is high.

As the dispersant, a dispersant that is ordinarily used in all-solid state secondary batteries can be appropriately selected and used. For example, a dispersant which is made of a low-molecular-weight molecule or an oligomer having a molecular weight of 200 or more and less than 3,000 and contains a functional group represented by a group of functional groups (I) and an alkyl group having 8 or more carbon atoms or an aryl group having 10 or more carbon atoms in the same molecule is preferred.

Group of functional groups (I): an acidic group, a group having a basic nitrogen atom, a (meth)acyl group, a (meth)acrylamide group, an alkoxysilyl group, an epoxy group, an oxetanyl group, an isocyanate group, a cyano group, a thiol group, and a hydroloxy group (an acidic group, a group having a basic nitrogen atom, an alkoxysilyl group, an epoxy group, an oxetanyl group, a cyano group, a thiol group, and a hydroloxy group are preferred, and a carboxy group, a sulfonic acid group, a cyano group, an amino group, and a hydroxy group are more preferred).

In a case in which there is a layer including the dispersant in the all-solid state secondary battery of the present invention, the content of the dispersant in the layer is preferably 0.2% to 10% by mass.

(Preparation of Solid Electrolyte Composition)

The solid electrolyte composition of the present invention can be manufactured by mixing or adding the inorganic solid electrolyte, the binder particles, the dispersion medium, and, as necessary, other components. For example, the solid electrolyte composition can be manufactured by mixing the above-described components using a variety of mixers. The mixing conditions are not particularly limited, and examples thereof include a ball mill, a bead mill, a planetary mixer, a blade mixer, a roll mill, a kneader, a disc mill, and the like.

A method for manufacturing the solid electrolyte composition preferably includes a step of preparing the binder particles by encompassing the ion-conductive substance in the polymer forming the binder particles and then mixing the inorganic solid electrolyte, the binder particles, the dispersion medium, and the like. In this preferred step, a method for encompassing the ion-conductive substance in the polymer is as described above.

[Sheet for All-Solid State Secondary Battery]

A sheet for an all-solid state secondary battery of the present invention may be a sheet that is used for all-solid state secondary batteries and includes a variety of aspects depending on the use. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, there are cases in which a variety of sheets described above will be collectively referred to as the sheet for an all-solid state secondary battery.

The sheet for an all-solid state secondary battery of the present invention is a sheet having a solid electrolyte layer or an active material (an electrode layer) on a base material. This sheet for an all-solid state secondary battery may have other layers as long as the sheet has a base material and a solid electrolyte layer or an active material, and a sheet having an active material layer is classified as an electrode sheet for an all-solid state secondary battery described below. Examples of other layers include a protective layer, a collector, a coating layer (a collector, another solid electrolyte layer, or another active material), and the like.

Examples of the solid electrolyte sheet for an all-solid state secondary battery of the present invention include a sheet having a solid electrolyte layer and, as necessary, a protective layer in this order on a base material which is intended to form the solid electrolyte layer of the all-solid state secondary battery of the present invention.

The base material is not particularly limited as long as the base material is capable of supporting the solid electrolyte layer, and examples thereof include sheet bodies (plate-like bodies) of the materials, the organic materials, the inorganic materials, and the like which have been described in the section of the collector. Examples of the organic materials include a variety of polymers, and specific examples thereof include polyethylene terephthalate, polypropylene, polyethylene, cellulose, and the like. Examples of the inorganic materials include glass, ceramic, and the like.

The constitution and the layer thickness of the solid electrolyte layer in the sheet for an all-solid state secondary battery are the same as the constitution and the layer thickness of the solid electrolyte layer described in the section of the all-solid state secondary battery of the present invention.

This sheet is obtained by forming a film of the solid electrolyte composition of the present invention on a base material (possibly, through other layers) (by means of coating and drying) and forming a solid electrolyte layer on the base material.

Here, the solid electrolyte composition of the present invention can be prepared using the above-described method.

The electrode sheet for an all-solid state secondary battery of the present invention (also simply referred to as "the electrode sheet of the present invention") is an electrode sheet having an active material layer on a metal foil as a collector which is intended to form the active material layer of the all-solid state secondary battery of the present invention. This electrode sheet is generally a sheet having a collector and an active material layer, but may be an aspect having a collector, an active material layer, and a solid electrolyte layer in this order or an aspect having a collector, an active material layer, a solid electrolyte layer, and an active material layer in this order.

The constitutions and the layer thicknesses of the respective layers constituting the electrode sheet are the same as the constitutions and the layer thicknesses of the respective layers described in the section of the all-solid state secondary battery of the present invention.

The electrode sheet is obtained by forming a film of the solid electrolyte composition of the present invention which contains an active material on a metal foil (by means of coating and drying) and forming an active material layer on the metal foil. The method for preparing the solid electrolyte composition containing an active material is the same as the method for preparing the solid electrolyte composition except for the fact that the active material is used. That is, the electrode sheet can be prepared using a step of preparing the binder particles by encompassing the ion-conductive substance in the polymer forming the binder particles and then mixing the active material, the inorganic solid electrolyte, the binder particles, and the dispersion medium.

[Manufacturing of All-Solid State Secondary Battery and Electrode Sheet for All-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the present invention and the like. The details will be described below.

The all-solid state secondary battery of the present invention can be manufactured using a method including (through) a step of applying the solid electrolyte composition of the present invention onto a metal foil which serves as a collector and forming a coated film (film manufacturing).

For example, a solid electrolyte composition containing a positive electrode active material is applied as a material for a positive electrode (a composition for a positive electrode layer) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode layer) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode layer) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

In the above-described manufacturing method, the solid electrolyte composition of the present invention may be used for any one of the composition for a positive electrode, the solid electrolyte composition, and the composition for a negative electrode, and the solid electrolyte composition of the present invention is preferably used for all of the compositions.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the composition for forming the positive electrode active material layer, the composition for forming the inorganic solid electrolyte layer, and the composition for forming the negative electrode active material layer may be dried after being applied respectively or may be dried after being applied so as to form multiple layers. The drying temperature is not particularly limited. The lower limit is preferably 30° C. or higher, more preferably 60° C. or higher, and still more preferably 80° C. or higher, and the upper limit is preferably 300° C. or lower, more preferably 250° C. or lower, and still more preferably 200° C. or lower. In a case in which the compositions are heated in the above-described temperature range, it is possible to remove the dispersion medium and form a solid state. In addition, the temperature is not excessively increased, and the respective members of the all-solid state secondary battery are not impaired, which is preferable. Therefore, in the all-solid state secondary battery, excellent general performance is exhibited, and it is possible to obtain a favorable bonding property and a favorable ion conductivity even without pressurization.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the inorganic solid electrolyte. Meanwhile, in a case in which the inorganic solid electrolyte and the binder particles coexist, the respective layers or the all-solid state secondary battery can also be pressed at a temperature higher than the glass transition temperature of the polymer forming the binder particles. However, generally, the pressing temperature is a temperature that does not exceed the melting point of the polymer.

The pressurization may be carried out in a state in which the applied solvent or dispersion medium has been dried in advance or in a state in which the solvent or the dispersion medium remains.

The atmosphere during the pressurization is not particularly limited and may be any one of under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to apply different pressures to the same portion.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then decreasing the pressure up to a pressure at which the all-solid state secondary battery is ordinarily used.

[Uses of all-Solid State Secondary Battery]

The all-solid state secondary battery of the present invention can be applied to a variety of uses. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer uses include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military uses and universe uses. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high safety, which is essential, and furthermore, the battery performance. In addition, in electric vehicles mounting high-capacity secondary batteries and domestic uses in which batteries are charged out every day, better safety is required against overcharging. According to the present invention, it is possible to preferably cope with the above-described use aspects and exhibit excellent effects.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S, LLT, LLZ, or the like is used. Meanwhile, the application of polymer compounds to inorganic all-solid state secondary batteries is not inhibited, and polymer compounds can also be applied as positive electrode active materials, negative electrode active materials, and binder particles of inorganic solid electrolyte particles.

Inorganic solid electrolytes are differentiated from electrolytes in which the above-described polymer compound such as polyethylene oxide is used as an ion conductive medium (polymer electrolyte), and inorganic compounds serve as ion conductive media. Specific examples thereof include the Li—P—S, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include lithium bistrifluoromethanesulfonylimide (LiTFSI).

In the case of being referred to as a "composition" in the present invention, the "composition" refers to a mixture obtained by uniformly mixing two or more components. Here, the composition needs to substantially maintain uniformity and may partially include agglomeration or uneven distribution as long as the compositions exhibit desired effects. In addition, in the case of being referred to as a solid electrolyte composition, the solid electrolyte composition basically refers to a composition (typically having a paste form) which serves as a material for forming the solid electrolyte layer or the like, and an electrolyte layer or the like formed by curing the above-described composition is not considered as the solid electrolyte composition.

EXAMPLES

Hereinafter, the present invention will be described in more detail on the basis of examples. Meanwhile, the present invention is not interpreted to be limited thereto. In the following examples, "parts" and "%" expressing compositions are mass-based unless particularly otherwise described. In addition, "room temperature" refers to 25° C.

Example 1

Figure 2:
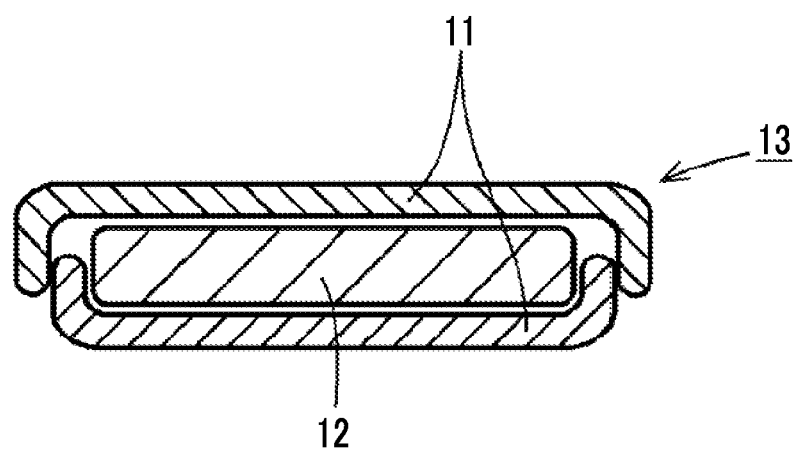
FIG. 2 is a vertical cross-sectional view schematically illustrating an all-solid state secondary battery (coin battery) produced in an example.

In Example 1, a sheet for an all-solid state secondary battery having a base material and a solid electrolyte layer and an all-solid state secondary battery illustrated in FIG. 2 were produced, and the performance (the bonding property and the ion conductivity) thereof was evaluated.

<Synthesis of Binder Particles (Preparation of Binder Particle Dispersion)>

(1) Synthesis of Electrolytic Solution-Containing Binder Particles B-1 to B-4

(1-1) Synthesis of Binder Particles B-1

Heptane (160 parts by mass), butyl acrylate A-5 (manufactured by Wako Pure Chemical Industries, Ltd.) (60 parts by mass), acrylonitrile A-42 (manufactured by Wako Pure Chemical Industries, Ltd.) (24 parts by mass), acrylic acid A-1 (manufactured by Wako Pure Chemical Industries, Ltd.) (10 parts by mass), a macromonomer MM-1 synthesized as described below (40 parts by mass in terms of the solid content amount), a solution of $LiPF_6$ (EC/DEC=1/1, concentration: 1 M, manufactured by Kishida Chemical Co., Ltd.) (24 parts by mass) as an electrolytic solution, and a polymerization initiator V-601 (trade name, manufactured by Wako Pure Chemical Industries, Ltd.) (1.4 parts by mass) were respectively added to a 1 L three-neck flask equipped with a reflux cooling pipe and a gas introduction cock. Nitrogen gas was introduced into the flask at a flow rate of 200 mL/min for 10 minutes, and the components were heated to 80° C. and stirred for four hours. V-601 (1.4 parts by mass) was further added to the obtained mixture, and the components were stirred at 90° C. for two hours. The obtained solution was diluted with heptane, thereby obtaining a dispersion liquid of binder particles B-1. The average particle diameter was 234 nm, the concentration of the solid content was 12.3%, and the mass-average molecular weight was 126,000.

(Synthesis of Macromonomer MM-1)

Toluene (190 parts by mass) was added to a 1 L three-neck flask equipped with a reflux cooling pipe and a gas introduction cock, nitrogen gas was introduced into the flask at a flow rate of 200 mL/min for 10 minutes, and toluene was heated to 80° C. A liquid prepared in a separate container (the following formulation a) was added dropwise thereto for two hours, and then the components were stirred at 80° C. for two hours. After that, V-601 (manufactured by Wako Pure Chemical Industries, Ltd.) (0.2 parts by mass) was added thereto, and furthermore, the components were stirred at 95° C. for two hours. 2,2,6,6,-Tetramethyl piperidine-1-oxyl (manufactured by Tokyo Chemical Industry Co., Ltd.)

(0.025 parts by mass), glycidyl methacrylate (manufactured by Wako Pure Chemical Industries, Ltd.) (13 parts by mass), and tetrabutyl ammonium bromide (manufactured by Tokyo Chemical Industry Co., Ltd.) (2.5 parts by mass) were added to the solution held at 95° C. after stirring and stirred at 120° C. for three hours. The obtained mixture was cooled to room temperature, added to methanol, and precipitated, the precipitate was filtered, then, washed with methanol twice, and then heptane (300 parts by mass) was added to the precipitate and dissolved the precipitate. A part of the obtained solution was distilled away at a reduced pressure, thereby obtaining a solution of the macromonomer MM-1. The concentration of the solid content was 43.4%, the SP value was 9.1, and the mass-average molecular weight was 16,000. The obtained macromonomer MM-1 will be illustrated below.

| (Formula α) | |
|---|---|
| Dodecyl methacrylate (manufactured by Wako Pure Chemical Industries, Ltd.) | 150 parts by mass |
| Methyl methacrylate A-4 (manufactured by Wako Pure Chemical Industries, Ltd.) | 59 parts by mass |
| 3-Mercaptobutyric acid (manufactured by Tokyo Chemical Industry Co., Ltd.) | 2 parts by mass |
| V-601 (manufactured by Wako Pure Chemical Industries, Ltd.) | 1.9 parts by mss |

Macromonomer MM-1

(1-2) Synthesis of Binder Particles B-2

A dispersion liquid of binder particles B-2 was obtained in the same manner as in the synthesis of the binder particles B-1 except for the fact that, in the synthesis of the binder particles B-1, the macromonomer MM-1 was changed to a macromonomer MM-2 synthesized as described below. The average particle diameter was 287 nm, the concentration of the solid content was 14.1%, and the mass-average molecular weight was 113,000.

(Synthesis of Macromonomer MM-2)

Toluene (190 parts by mass) was added to a 1 L three-neck flask equipped with a reflux cooling pipe and a gas introduction cock, nitrogen gas was introduced into the flask at a flow rate of 200 mL/min for 10 minutes, and toluene was heated to 80° C. A liquid prepared in a separate container (the following formulation a) was added dropwise thereto for two hours, and then the components were stirred at 80° C. for two hours. After that, V-601 (manufactured by Wako Pure Chemical Industries, Ltd.) (0.2 parts by mass) was added thereto, and furthermore, the components were stirred at 95° C. for two hours. 2,2,6,6,-Tetramethyl piperidine-1-oxyl (manufactured by Tokyo Chemical Industry Co., Ltd.) (0.025 parts by mass), 2-isocyanatoethyl methacrylate (manufactured by Wako Pure Chemical Industries, Ltd.) (13 parts by mass), and a bismuth catalyst: NEOSTAN U-600 (trade name, manufactured by Nitto Kasei Co., Ltd.) (0.6 parts by mass) were added to the solution held at 95° C. after stirring and stirred at 95° C. for three hours. The obtained mixture was cooled to room temperature, added to methanol, and precipitated, the precipitate was filtered, then, washed with methanol twice, and then heptane (300 parts by mass) was added to the precipitate and dissolved the precipitate. A part of the obtained solution was distilled away at a reduced pressure, thereby obtaining a solution of the macromonomer MM-2. The concentration of the solid content was 40.5%, and the mass-average molecular weight was 13,000. The obtained macromonomer MM-2 will be illustrated below.

| (Formula β) | |
|---|---|
| Dodecyl methacrylate (manufactured by Wako Pure Chemical Industries, Ltd.) | 150 parts by mass |
| Methyl methacrylate A-4 (manufactured by Wako Pure Chemical Industries, Ltd.) | 59 parts by mass |
| 6-Mercapto-1-hexanol (manufactured by Aldrich-Sigma, Co. LLC.) | 2 parts by mass |
| V-601 (manufactured by Wako Pure Chemical Industries, Ltd.) | 1.9 parts by mass |

Macromonomer MM-2

(1-3) Synthesis of Binder Particles B-3

A dispersion liquid of binder particles B-3 was obtained in the same manner as in the synthesis of the binder particles B-1 except for the fact that, in the synthesis of the binder particles B-1, as the electrolytic solution, the solution of $LiPF_6$ (EC/DEC=1/1, concentration: 1 M) was changed to a solution of $LiPF_6$ (EC/DMC=3/7, concentration: 1 M, manufactured by Kishida Chemical Co., Ltd.). The average particle diameter was 275 nm, the concentration of the solid content was 15.3%, and the mass-average molecular weight was 101,000.

(1-4) Synthesis of Binder Particles B-4

A dispersion liquid of binder particles B-4 was obtained in the same manner as in the synthesis of the binder particles B-1 except for the fact that, in the synthesis of the binder particles B-1, the solution of $LiPF_6$ (EC/DEC=1/1, concentration: 1 M) was changed to a solution (electrolytic solution) obtained by dissolving LiTFSI (lithium bistrifluoromethylsulphonylimide) at a concentration of 1 M in DEME-TFSI (manufactured by Kanto Kagaku) which was an ionic liquid. The average particle diameter was 256 nm, the concentration of the solid content was 18.2%, and the mass-average molecular weight was 108,000.

(2) Synthesis of Sulfide-Based Inorganic Solid Electrolyte-Containing Binder Particles B-5

Heptane (160 parts by mass), hydroxyethyl acrylate A-10 (manufactured by Wako Pure Chemical Industries, Ltd.) (60 parts by mass), methyl methacrylate A-4 (manufactured by Wako Pure Chemical Industries, Ltd.) (24 parts by mass), acrylic acid A-1 (manufactured by Wako Pure Chemical Industries, Ltd.) (10 parts by mass), the macromonomer MM-1 (40 parts by mass in terms of the solid content amount), LPS synthesized below (sulfide-based inorganic solid electrolyte) (40 parts by mass), and a polymerization initiator V-601 (trade name, manufactured by Wako Pure Chemical Industries, Ltd.) (1.4 parts by mass) were respectively added to a 1 L three-neck flask equipped with a reflux cooling pipe and a gas introduction cock. Nitrogen gas was introduced into the flask at a flow rate of 200 mL/min for 10 minutes, and then the components were heated to 80° C. and stirred for four hours. V-601 (1.4 parts by mass) was further added to the obtained mixture, and the components were stirred at 90° C. for two hours. The obtained solution was diluted with heptane, thereby obtaining a dispersion liquid of binder particles B-5. The average particle diameter was 298 nm, the concentration of the solid content was 40.3%, and the mass-average molecular weight was 88,000.

(3) Synthesis of Solid Polymer Electrolyte-Containing Binder Particles B-6

Heptane (160 parts by mass), polyethylene glycol monomethyl ether acrylate A-14 (the SP value: 11.3 $(cal^{1/2} cm^{-3/2})$, n=9, manufactured by Aldrich-Sigma, Co. LLC.) (30 parts by mass), lithium bis(trifluoromethylsulphonyl) imide (manufactured by Wako Pure Chemical Industries, Ltd.) (10 parts by mass) (dissolved in polyethylene glycol monomethyl ether acrylate in advance), methyl methacrylate A-4 (manufactured by Wako Pure Chemical Industries, Ltd.) (34 parts by mass), acrylic acid A-1 (manufactured by Wako Pure Chemical Industries, Ltd.) (20 parts by mass), the macromonomer MM-1 (40 parts by mass in terms of the solid content amount), and a polymerization initiator V-601 (trade name, manufactured by Wako Pure Chemical Industries, Ltd.) (1.4 parts by mass) were respectively added to a 1 L three-neck flask equipped with a reflux cooling pipe and a gas introduction cock. Nitrogen gas was introduced into the flask at a flow rate of 200 mL/min for 10 minutes, and then the components were heated to 80° C. and stirred for four hours. V-601 (1.4 parts by mass) was further added to the obtained mixture, and the components were stirred at 90° C. for two hours. The obtained solution was diluted with heptane, thereby obtaining a dispersion liquid of binder particles B-6. The average particle diameter was 267 nm, the concentration of the solid content was 38.5%, and the mass-average molecular weight was 101,000.

(4) Synthesis of Sulfide-Based Inorganic Solid Electrolyte-Containing Binder Particles B-7 to B-13

Dispersion liquids of binder particles B-7 to B-13 were respectively obtained in the same manner as in the synthesis of the binder particles B-5 except for the fact that, in the synthesis of the binder particles B-5, the ion-conductive substance and the amount of the ion-conductive substance used which was the mass ratio between the ion-conductive substance and the polymer were respectively changed as shown in Table 1. The average particle diameters, the concentrations of the solid content, and the mass-average molecular weights are shown in Table 1.

(5) Synthesis of Sulfide-Based Inorganic Solid Electrolyte-Containing Binder Particles B-14

(5-1) Synthesis of Terminal Diol Polydodecyl Methacrylate

Methyl ethyl ketone (20 mL) was prepared in a 500 mL three-neck flask and heated to 75° C. under a nitrogen stream. Meanwhile, dodecyl methacrylate (manufactured by Wako Pure Chemical Industries, Ltd.) (70 g) and methyl ethyl ketone (110 g) were prepared in a 500 mL measuring cylinder and stirred. Thioglycerol (manufactured by Wako Pure Chemical Industries, Ltd.) (2.9 g) as a chain transfer agent and a radical polymerization initiator V-601 (manufactured by Wako Pure Chemical Industries, Ltd.) (3.2 g) were added thereto and further stirred. The obtained monomer solution was added dropwise to the 500 mL three-neck flask for two hours, and radical polymerization was initialized. Furthermore, after the dropwise addition, the components were heated and stirred at 75° C. for six hours. The obtained polymerized liquid was condensed at a reduced pressure, methyl ethyl ketone was distilled away, and then the solid content was dissolved in heptane, thereby obtaining a heptane solution of 25% by mass of terminal diol polydodecyl methacrylate (292 g).

The mass-average molecular weight of the obtained polymer was 3,200.

(5-2) Synthesis of Polyurea Colloid Particles (Aa-1)

The heptane solution of 25% by mass of terminal diol polydodecyl methacrylate synthesized in (5-1) (260 g) was added to a 1 L three-neck flask and diluted with heptane (110 g). Isophorone diisocyanate (manufactured by Wako Pure Chemical Industries, Ltd.) (11.1 g) and NEOSTAN U-600 (trade name, manufactured by Nitto Kasei Co., Ltd.) (0.1 g) were added thereto and heated and stirred at 75° C. for five hours. After that, a diluted liquid obtained by diluting isophorone diisocyanate (0.4 g) with heptane (125 g) was added dropwise thereto for one hour. Ten minutes after the initiation of the dropwise addition, the reaction liquid changed from a transparent solution to a solution having a light yellow fluorescent color. Therefore, it was found that urea colloids were formed. The reaction liquid was cooled to room temperature, and a heptane solution of 15% by mass of polyurea colloid particles (Aa-1) (506 g) was obtained.

The mass-average molecular weight of the polyurea of the polyurea colloid particles (Aa-1) was 9,600.

(5-3) Synthesis of Sulfide-Based Inorganic Solid Electrolyte-Containing Binder Particles B-14

Binder particles B-7 were synthesized using the polyurea colloid particles (Aa-1).

Specifically, dicyclohexylmethane diisocyanate (manufactured by Tokyo Chemical Industry Co., Ltd.) (2.6 g), 1,4-butanediol (manufactured by Wako Pure Chemical Industries, Ltd.) (0.42 g), 2,2-bis(hydroxymehyl) phthalate (manufactured by Tokyo Chemical Industry Co., Ltd.) (0.28 g), KURARAY POLYOL P-1020 (trade name, manufactured by Kuraray Co., Ltd.) (2.9 g), and LPS synthesized below (a sulfide-based inorganic solid electrolyte) (2.6 g) were added to a 50 mL sample bottle. The heptane solution of 15% by mass of polyurea colloid particles (Aa-1) synthesized in (5-2) (15.7 g) was added thereto and dispersed for 30 minutes using a homogenizer while being heated at 50° C. During the addition and dispersion, the liquid mixture was microparticulated and turned into a light orange slurry. The obtained slurry was rapidly injected into a 100 mL three-neck flask stirred at 80° C. and 400 rpm in advance, NEOSTAN U-600 (manufactured by Nitto Kasei Co., Ltd.) (0.1 g) was added thereto, heated and stirred at 80° C. for three hours. The slurry became a white emulsion form. Therefore, it was assumed that polyurethane particles were formed. The obtained white emulsion-form slurry was cooled, thereby obtaining a dispersion liquid of binder particles B-14. The average particle diameter was 258 nm, the concentration of the solid content was 52.3%, and the mass-average molecular weight was 98,000.

(6) Synthesis of Sulfide-Based Inorganic Solid Electrolyte-Containing Binder Particles B-15

(6-1) Synthesis of Polyimide

At the time of adding N-methyl pyrrolidone (123 mL) and 4,4'-(2,2-hexafluoroisopropylidene)diphthalic anhydride (manufactured by Tokyo Chemical Industry Co., Ltd.) (54.97 g, 0.124 mol) to a 1 L three-neck flask, dissolving the components at 40° C., and stirring the components under a nitrogen stream, an N-methyl pyrrolidone solution of 41.44 g (0.124 mol) of 2,2-bis(4-aminophenyl)hexafluoropropane (manufactured by Tokyo Chemical Industry Co., Ltd.) (84.0 mL) was applied dropwise thereto for 30 minutes while maintaining the system at 40° C. The reaction liquid was stirred at 40° C. for 2.5 hours, pyridine (2.94 g, 0.037 mol) and an acid anhydride (31.58 g, 0.31 mol) were respectively added thereto and, furthermore, stirred at 80° C. for three hours. After that, acetone (676.6 mL) was added to the reaction liquid, thereby diluting the reaction liquid. At the time of adding and stirring methanol (1.15 L) and acetone (230 mL) in a 5 L stainless steel container, the acetone-diluted liquid of the reaction liquid was added dropwise thereto. The obtained polymer was suction-filtered and dried by blowing the air at 60° C., thereby obtaining a polymer P-1 (80.7 g).

(6-2) Synthesis of Binder Particles B-15

The polymer P-1 (10 parts by mass) was dissolved in THF (30 parts by mass), and LPS synthesized below (a sulfide-based inorganic solid electrolyte) (4 parts by mass) was added thereto. Heptane (200 parts by mass) was added dropwise to the obtained liquid. The obtained solid was filtered and dried, thereby obtaining binder particles B-15.

The average particle diameter was 374 nm, the concentration of the solid content was 100%, and the mass-average molecular weight was 87,000.

(Synthesis of Sulfide-Based Inorganic Solid Electrolyte LPS)

In a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were weighed respectively, injected into an agate mortar, and mixed together using an agate muddler for five minutes. The mixing ratio between $Li_2S$ and $P_2S_5$ was set to 75:25 ($Li_2S:P_2S_5$) in terms of molar ratio.

Zirconia beads having a diameter of 5 mm (66 g) were injected into a 45 mL zirconia container (manufactured by Fritsch Japan Co., Ltd.), the full amount of a mixture of the lithium sulfide and the diphosphorus pentasulfide was injected thereinto, and the container was completely sealed in the argon atmosphere. The container was set in a planetary ball mill P-7 (trade name, manufactured by Fritsch Japan Co., Ltd.), mechanical milling was carried out at a temperature of 25° C. and a rotation speed of 510 rpm for 20 hours, thereby obtaining yellow powder (6.20 g) of a sulfide-based inorganic solid electrolyte (Li/P/S glass, expressed as LPS in some cases).

The encompassing state of the ion-conductive substance in the binder particles and the measurement results of the concentrations of the solid contents of the dispersion liquids of the binder particles and the macromonomer solutions, and the glass transition temperatures (Tg), the average particle diameters, and the mass-average molecular weights of the polymers forming the binder particles and the macromonomers are shown in Table 1.

<Method for Measuring Concentration of Solid Content>

The concentrations of the solid contents of the dispersion liquid of the binder particles and the macromonomer solution were measured on the basis of the following method.

The dispersion liquid of the binder particles or the macromonomer solution (approximately 1.5 g) was weighed in an aluminum cup having a diameter of 7 cm, and the weighing value was scanned to three places of decimals. Subsequently, the dispersion liquid or the macromonomer solution was heated and dried at 90° C. for two hours in a nitrogen atmosphere and heated and dried at 140° C. for two hours. The mass of the obtained residue in the aluminum cup was measured, and the concentration of the solid content was computed from the following expression. The measurement was carried out five times, and the average value of three measurement values excluding the maximum value and the minimum value was employed.

The concentration of the solid content (%)=the amount (g) of the residue in the aluminum cup/the dispersion liquid of the binder particles or the macromonomer solution (g)

<Method for Measuring Tg>

The glass transition temperature (Tg) of the polymer forming the binder particles was measured using the above-described method. The results are shown in Table 1.

<Confirmation of Encompassing State of Ion-Conductive Substance>

In each of the synthesized binder particles B-1 to B-15, the encompassing state of the ion-conductive substance was confirmed by computing the coating ratio.

<Measurement of Average Particle Diameter of Binder Particles>

The average particle diameter (PD) of the binder particles was measured in the following order. A dispersion liquid (1% by mass) of a dried specimen of the dispersion liquid of the binder particles prepared above was prepared using an appropriate solvent (a dispersion medium that was used to prepare the solid electrolyte composition; heptane in the case of the binder particles B-1). This dispersion liquid specimen was irradiated with 1 kHz ultrasonic waves for 10 minutes, and then the volume-average particle diameter of resin particles was measured using a laser diffraction/scattering-type particle size distribution measurement instrument LA-920 (trade name, manufactured by Horiba Ltd.).

<Measurement of Mass-Average Molecular Weight>

The mass-average molecular weights of the polymer forming the binder particles and the macromonomer were measured using the above-described method (Condition 2).

TABLE 1

| No. | Monomer having SP value of 10.5 ($cal^{1/2}$ $cm^{-3/2}$) or more Kind | Content % | Ion-conductive substance | Coating ratio % | Ion-conductive substance: polymer (mass ratio) | PD nm | Mass-average molecular weight | Concentration of solid content % | Tg ° C. |
|---|---|---|---|---|---|---|---|---|---|
| B-1 | Acrylonitrile | 18 | $LiPF_6$ in solution of EC/DEC = 1/1 | 79 | 1:5.6 | 234 | 126,000 | 12.3 | −18 |
| B-2 | Acrylonitrile | 18 | | 78 | 1:5.6 | 287 | 113,000 | 14.1 | −19 |
| B-3 | Acrylonitrile | 18 | LiPF6 in solution of EC/DEC = 3/7 | 83 | 1:5.6 | 275 | 101,000 | 15.3 | −15 |
| B-4 | Acrylonitrile | 18 | LiTFSI/DEME—TFSI | 97 | 1:5.6 | 256 | 108,000 | 18.2 | −13 |
| B-5 | Hydroxyethyl acrylate* | 45 | LPS | 100 | 1:3.4 | 298 | 88,000 | 40.3 | 0 |

TABLE 1-continued

| No. | Monomer having SP value of 10.5 ($cal^{1/2} cm^{-3/2}$) or more Kind | Content % | Ion-conductive substance | Coating ratio % | Ion-conductive substance: polymer (mass ratio) | PD nm | Mass-average molecular weight | Concentration of solid content % | Tg °C. |
|---|---|---|---|---|---|---|---|---|---|
| B-6 | PEOAA | 24 | LiTFSI | 100 | 1:2.4 | 267 | 101,000 | 38.5 | −33 |
| B-7 | Hydroxyethyl acrylate* | 45 | LiTFSI/EMI—TFSI | 97 | 1:5.6 | 289 | 95,000 | 18.5 | −13 |
| B-8 | Hydroxyethyl acrylate* | 45 | LiTFSI/EMI—CNCN | 97 | 1:5.6 | 295 | 89,000 | 17.9 | −13 |
| B-9 | Hydroxyethyl acrylate* | 45 | LiTFSI/EMI—FSI | 97 | 1:5.6 | 268 | 98,000 | 19.5 | −13 |
| B-10 | Hydroxyethyl acrylate* | 45 | LiTFSI/DEME—TFSI | 97 | 1:5.6 | 256 | 106,000 | 19.3 | −13 |
| B-11 | Hydroxyethyl acrylate* | 45 | LiFSI/DEME—TFSI | 97 | 1:5.6 | 245 | 103,000 | 16.5 | −13 |
| B-12 | Hydroxyethyl acrylate* | 45 | LiTFSI/DEME—TFSI | 52 | 1:0.5 | 580 | 68,000 | 17.9 | −13 |
| B-13 | Hydroxyethyl acrylate* | 45 | LiTFSI/DEME—TFSI | 99 | 1:10 | 215 | 117,000 | 19.5 | −13 |
| B-14 | — | — | LPS | 100 | 1:3.3 | 258 | 98,000 | 52.3 | 9 |
| B-15 | — | — | LPS | 100 | 1:2.5 | 374 | 87,000 | 100 | 370 |

<Notes of Table>
Monomers with a sign '*' have a hydroxyl group.
DEME—TFSI: N,N-diethyl-N-methyl-N-(2-methoxyethyl)ammonium bis(trifluoromethanesulfonyl) imide
EMI—TFSI: 1-Ethyl-3-methylimidazolium bis(trifluoromethanesulfonyl) imide
EMI—CNCN: 1-Ethyl-3-methylimidazolium dicyanamide
EMI—FSI: 1-Ethyl-3-methylimidazolium bis(fluorosulfonyl)imide
LiTFSI: Lithium bistrifluoromethanesulfonylimide
LiFSI: Lithium bisfluorosulfonylimide
PEOAA: Polyethylene glycol monomethyl ether acrylate
EC: Ethylene carbonate
DEC: Diethyl carbonate
DMC: Dimethyl carbonate <Synthesis of Binder Particles BC-1 for Comparison> n-Butyl acrylate (A-5) (700 parts by mass), styrene (200 parts by mass), methacrylic acid (A-2) (5 parts by mas), divinyl benzene (10 parts by mass), polyoxyethylene lauryl ether (manufactured by Kao Corporation, EMULGEN 108, non-ionic surfactant, the number of carbon atoms in an alkyl group: 12, HLB value: 12.1) (25 parts by mass), ion exchange water (1,500 parts by mass), and 2,2'-azobisisobutylorinitrile (15 parts by mass) as a polymerization initiator were prepared in an autoclave and were stirred for 10 minutes. After that, the components were heated to 80° C. and thus polymerized. In addition, after the initiation of the polymerization, the components were cooled, thereby stopping the polymerization reaction. Decalin (3,000 parts by mass) was added to the obtained dispersion liquid, and the dispersion liquid was dried at a reduced pressure so as to remove moisture, thereby obtaining latex of binder particles BC-1.

<Synthesis of Binder Particles BC-2 for Comparison>

Cyclohexanone (160 parts by mass) was added to a 1 L three-neck flask equipped with a reflux cooling pipe and a gas introduction cock, nitrogen gas was introduced into the flask at a flow rate of 200 mL/min for 10 minutes, and cyclohexanone was heated to 80° C. A liquid prepared in a separate container (a liquid obtained by mixing terminal acryloyl-modified alkylene oxide macromonomer (trade name: BLEMMER AME-400, manufactured by NOF Corporation) (140 parts by mass) and (N,N-diethyl-N-methyl-N-(2-methoxyethyl)ammonium bis(trifluoromethanesulfonyl) imide (manufactured by Kanto Kagaku) (90 parts by mass)) was added dropwise thereto for two hours, and then the components were stirred at 80° C. for two hours. After that, V-601 (1.4 parts by mass) was added thereto, and furthermore, the components were stirred at 90° C. for two hours. The obtained solution was solidified, thereby obtaining binder particles BC-2.

<Synthesis of Binder Particles BC-3 for Comparison>

A heptane solution of 40% by mass of a macromonomer MC-1 synthesized as described below (7.2 g), methyl methacrylate A-4 (manufactured by Wako Pure Chemical Industries, Ltd.) (12.7 g), acrylonitrile A-42 (manufactured by Wako Pure Chemical Industries, Ltd.) (5.4 g), heptane (manufactured by Wako Pure Chemical Industries, Ltd.) (207 g), and azoisobutyronitrile (1.4 g) were respectively added to a 2 L three-neck flask equipped with a reflux cooling pipe and a gas introduction cock, nitrogen gas was introduced into the flask at a flow rate of 200 mL/min for 10 minutes, and then the components were heated to 100° C. A liquid prepared in a separate container (a liquid obtained by respectively mixing a heptane solution of 40% by mass of the following macromonomer MC-1 (93.1 g), methyl methacrylate (A-4) (240.6 g), acrylonitrile (A-42) (103.2 g), heptane (300.0 g), and azoisobutyronitrile (2.1 g) together) was added dropwise thereto for four hours. After the completion of the dropwise addition, azoisobutyronitrile (0.5 g) was added to the reaction liquid. After that, the components were stirred at 100° C. for two hours and cooled to room temperature. The reaction liquid was filtered, thereby obtaining a dispersion liquid of binder particles BC-3. The concentration of the solid content was 39.2%.

(Synthesis of Macromonomer MC-1)

Glycidyl methacrylate A-31 (manufactured by Tokyo Chemical Industry Co., Ltd.) was reacted with a self-condensate of 12-hydroxystearic acid (manufactured by Wako Pure Chemical Industries, Ltd.) (GPC polystyrene standard number-average molecular weight: 2,000), thereby synthesizing a macromonomer. The macromonomer, methyl methacrylate, and glycidyl methacrylate were polymerized together at a ratio at which the molar ratio between the macromonomer, methyl methacrylate A-4, and glydicyl methacrylate (manufactured by Tokyo Chemical Industry Co., Ltd.) reached 1:0.99:0.01, thereby obtaining a polymer. An acrylic acid A-1 (manufactured by Wako Pure Chemical Industries, Ltd.) was reacted with the polymer, thereby obtaining a target macromonomer MC-1. The SP value of this macromonomer MC-1 was 9.3, and the mass-average molecular weight was 2,300.

The obtained macromonomer MC-1 is illustrated below.

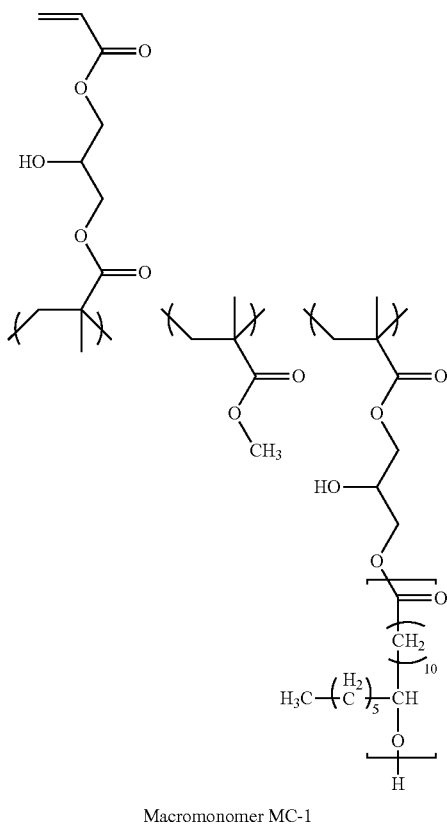

Macromonomer MC-1

<Synthesis of Binder Particles BC-4 for Comparison>

Heptane (160 parts by mass), butyl acrylate A-5 (manufactured by Wako Pure Chemical Industries, Ltd.) (60 parts by mass), methyl methacrylate A-4 (manufactured by Wako Pure Chemical Industries, Ltd.) (24 parts by mass), methyl acrylate A-3 (manufactured by Wako Pure Chemical Industries, Ltd.) (10 parts by mass), the macromonomer MM-1 (40 parts by mass in terms of the solid content amount), and a polymerization initiator V-601 (trade name, manufactured by Wako Pure Chemical Industries, Ltd.) (1.4 parts by mass) were respectively added to a 1 L three-neck flask equipped with a reflux cooling pipe and a gas introduction cock. Nitrogen gas was introduced into the flask at a flow rate of 200 mL/min for 10 minutes, and the components were heated to 80° C. and stirred for four hours. V-601 (1.4 g) was further added to the obtained mixture, and the components were stirred at 90° C. for two hours. The obtained solution was diluted with heptane. After that, a solution of $LiPF_6$ (EC/DEC=1/1, concentration: 1 M, manufactured by Kishida Chemical Co., Ltd.) (24 parts by mass) was added thereto as an electrolytic solution, thereby obtaining a dispersion liquid of binder particles BC-4. The average particle diameter was 228 nm, the concentration of the solid content was 40.3%, the mass-average molecular weight was 113,000, the mass ratio of the ion-conductive substance to the polymer was 1:5.6, and Tg was −18° C. In the binder particles BC-4, the electrolytic solution was not encompassed (coated) in the polymer forming the binder particles BC-4 (coating ratio: 0%).

<Example of Preparation of Solid Electrolyte Composition>

180 zirconia beads having a diameter of 5 mm were injected into a 45 mL zirconia container (manufactured by Fritsch Japan Co., Ltd.), and the above-synthesized LPS (4.85 g; 4.7 g in the case of S-2), the binder particles (0.15 g in terms of the solid content mass; 0.3 g in the case of S-2), and the dispersion medium (17.0 g) were injected thereinto as shown in Table 2. After that, the container was set in a planetary ball mill P-7 manufactured by Fritsch Japan Co., Ltd., the components were continuously mixed at a temperature of 25° C. and a rotation speed of 300 rpm for two hours, thereby preparing individual solid electrolyte compositions S-1 to S-17 and T-1 to T-4.

The Clog P of the dispersion medium shown in Table 2 is a value computed as described above.

TABLE 2

| No. | Sulfide-based inorganic solid electrolyte | % | Binder particles | % | Dispersion medium | CLog P value | Note |
|---|---|---|---|---|---|---|---|
| S-1 | LPS | 97% | B-1 | 3% | Heptane | 4.4 | Present Invention |
| S-2 | LPS | 94% | B-1 | 6% | Heptane | 4.4 | Present Invention |
| S-3 | LPS | 97% | B-1 | 3% | MEK | 0.32 | Present Invention |
| S-4 | LPS | 97% | B-2 | 3% | Heptane | 4.4 | Present Invention |
| S-5 | LPS | 97% | B-3 | 3% | Heptane | 4.4 | Present Invention |
| S-6 | LPS | 97% | B-4 | 3% | Heptane | 4.4 | Present Invention |
| S-7 | LPS | 97% | B-5 | 3% | Heptane | 4.4 | Present Invention |
| S-8 | LPS | 97% | B-6 | 3% | Heptane | 4.4 | Present Invention |
| S-9 | LPS | 97% | B-7 | 3% | Heptane | 4.4 | Present Invention |
| 5-10 | LPS | 97% | B-8 | 3% | Heptane | 4.4 | Present Invention |
| S-11 | LPS | 97% | B-9 | 3% | Heptane | 4.4 | Present Invention |
| S-12 | LPS | 97% | B-10 | 3% | Heptane | 4.4 | Present Invention |
| S-13 | LPS | 97% | B-11 | 3% | Heptane | 4.4 | Present Invention |
| S-14 | LPS | 97% | B-12 | 3% | Heptane | 4.4 | Present Invention |
| S-15 | LPS | 97% | B-13 | 3% | Heptane | 4.4 | Present Invention |
| S-16 | LPS | 97% | B-14 | 3% | Heptane | 4.4 | Present Invention |
| S-17 | LPS | 97% | B-15 | 3% | Heptane | 4.4 | Present Invention |
| T-1 | LPS | 97% | BC-1 | 3% | Toluene | 2.64 | Comparative Example |
| T-2 | LPS | 97% | BC-2 | 3% | Acetonitrile | −0.93 | Comparative Example |
| T-3 | LPS | 97% | BC-3 | 3% | Heptane | 4.4 | Comparative Example |

TABLE 2-continued

| No. | Sulfide-based inorganic solid electrolyte | % | Binder particles | % | Dispersion medium | CLog P value | Note |
|---|---|---|---|---|---|---|---|
| T-4 | LPS | 97% | BC-4 | 3% | Heptane | 4.4 | Comparative Example |

<Notes of Table>
In the table, the numerical values of the sulfide-based inorganic solid electrolyte and the binder particles are mass ratios (%).
CLog P value: The CLog P value of the dispersion medium
LPS: Sulfide-based inorganic solid electrolyte synthesized above
MEK: Methyl ethyl ketone <Production of Sheet for all-Solid State Secondary Battery (Solid Electrolyte Sheet for all-Solid State Secondary Battery)>

Each of the solid electrolyte compositions obtained above was applied onto a 20 μm-thick aluminum foil using an applicator (trade name: SA-201 Baker type applicator, manufactured by Tester Sangyo Co., Ltd.) and heated at 80° C. for two hours, thereby drying the solid electrolyte composition. After that, the dried solid electrolyte composition was heated and pressurized at a temperature of 80° C. and a pressure of 600 MPa using a heat pressing machine, thereby obtaining individual sheets for an all-solid state secondary battery Nos. 101 to 117 and c11 to c13. The film thickness of the solid electrolyte layer was 50 μm.

On the produced sheets for an all-solid state secondary battery, the following tests were carried out, and the results are shown in Table 3.

<Measurement of Ion Conductivity>

A disc-shaped piece having a diameter of 14.5 mm was cut out from the sheet for an all-solid state secondary battery obtained above, and the sheet for an all-solid state secondary battery 12 was put into a coin case 11 illustrated in FIG. 2. Specifically, an aluminum foil cut out in a disc shape having a diameter of 15 mm (not illustrated in FIG. 2) was brought into contact with the solid electrolyte layer, a spacer and a washer (both are not illustrated in FIG. 2) were combined into the coin case, and the aluminum foil was put into the 2032-type stainless steel coin case 11. The coin case 11 was swaged, thereby producing a cell for measuring ion conductivity (coin battery) 13.

The ion conductivity was measured using the above-obtained cell for ion conductivity measurement. Specifically, the alternating current impedance was measured in a constant-temperature tank (30° C.) using a 1255B FREQUENCY RESPONSE ANALYZER (trade name) manufactured by Solartron Analytical. Inc. at a voltage magnitude of 5 mV and a wavelength of 1 MHz to 1 Hz. Therefore, the resistance of the specimen in the film thickness direction was obtained by means of calculation using Expression (A).

Ion conductivity (mS/cm)=1,000×specimen film thickness (cm)/(resistance (Ω)×specimen area (cm$^2$))  Expression (A)

<Evaluation of Bonding Property>

A 2 cm×10 cm-sized specimen was cut out from the sheet for an all-solid state secondary battery. The aluminum foil (collector)-side surface of this sheet was wound around a stainless steel (SUS) rod (SUS rod) in the longitudinal direction, and the occurrence of the peeling of the solid electrolyte layer from the aluminum foil was observed. The above-described operation was carried out sequentially from an SUS rod having a large diameter to an SUS rod having a small diameter, and the bonding property was evaluated using the following standards from the diameter of an SUS rod in which the solid electrolyte layer was peeled off from the aluminum foil. In the present test, in a case in which even a part of the solid electrolyte layer was peeled off and dropped from the aluminum foil, "peeling" was determined to occur. In the present test, the evaluation standards of "3" or higher are pass.

Evaluation Standards

The diameter of the SUS rod in a case in which the solid electrolyte layer was peeled off from the aluminum foil was
5: Less than 10 mm
4: 10 mm or more and less than 20 mm
3: 20 mm or more and less than 40 mm
2: 40 mm or more and less than 100 mm
1: 100 mm or more

TABLE 3

| No. | Electrolyte layer | Bonding property | Ion conductivity (mS/cm) | Note |
|---|---|---|---|---|
| 101 | S-1 | 4 | 0.61 | Present Invention |
| 102 | S-2 | 5 | 0.55 | Present Invention |
| 103 | S-3 | 4 | 0.38 | Present Invention |
| 104 | S-4 | 4 | 0.59 | Present Invention |
| 105 | S-5 | 4 | 0.49 | Present Invention |
| 106 | S-6 | 4 | 0.60 | Present Invention |
| 107 | S-7 | 4 | 0.59 | Present Invention |
| 108 | S-8 | 4 | 0.43 | Present Invention |
| 109 | S-9 | 5 | 0.63 | Present Invention |
| 110 | S-10 | 5 | 0.65 | Present Invention |
| 111 | S-11 | 5 | 0.62 | Present Invention |
| 112 | S-12 | 5 | 0.62 | Present Invention |
| 113 | S-13 | 5 | 0.61 | Present Invention |
| 114 | S-14 | 3 | 0.62 | Present Invention |
| 115 | S-15 | 5 | 0.39 | Present Invention |
| 116 | S-16 | 4 | 0.56 | Present Invention |
| 117 | S-17 | 3 | 0.52 | Present Invention |
| c11 | T-1 | 1 | 0.11 | Comparative Example |
| c12 | T-2 | 1 | 0.03 | Comparative Example |
| c13 | T-3 | 3 | 0.27 | Comparative Example |
| c14 | T-4 | 3 | 0.31 | Comparative Example |

From the results shown in Table 3, it was found that the solid electrolyte composition of the present invention including the specific binder particles encompassing the ion-conductive substance, the inorganic solid electrolyte, and the dispersion medium is capable of suppressing an increase in the interface resistance between the solid particles and the like (the ion conductivity is high) and, furthermore, realizing a favorable bonding property.

In contrast, the solid electrolyte compositions (c11 and c12) of the comparative examples including the binder particles consisting of the polymer were insufficient in terms of both the ion conductivity and the bonding property. In addition, the solid electrolyte composition (c13) of the comparative example included the binder particles consisting of the polymer having a repeating unit derived from a monomer having an SP value of 11 (cal$^{1/2}$ cm$^{-3/2}$) or more, had a bonding property that reached the pass level in the present test, but had an insufficient ion conductivity. Furthermore, in the solid electrolyte composition (c14) of the comparative example including the binder particles encompassing the ion-conductive substance, the improvement of the ion conductivity was admitted, but was not sufficient.

Example 2

In Example 2, an all-solid state secondary battery illustrated in FIG. 2 which had the layer constitution illustrated in FIG. 1 was produced, and the performance thereof was evaluated.

<Preparation of Composition for Positive Electrode Layer>

One hundred eighty zirconia beads having a diameter of 5 mm were injected into a 45 mL zirconia container (manufactured by Fritsch Japan Co., Ltd.), and LPS synthesized in Example 1 (2.7 g) and a dispersion liquid of binder particles (0.3 g in terms of the solid content) were injected into a dispersion medium (22 g) as shown in Table 4. After that, the container was set in a planetary ball mill P-7 manufactured by Fritsch Japan Co., Ltd., the components were stirred at a temperature of 25° C. and a rotation speed of 300 rpm for two hours. After that, a positive electrode active material (7.0 g) was injected thereinto, the container was, again, set in the planetary ball mill P-7, and the components were continuously mixed together at a temperature of 25° C. and a rotation speed of 100 rpm for 15 minutes (the amounts blended were changed for U-3). Individual compositions for a positive electrode layer U-1 to U-14 and V-1 to V-4 were obtained in the above-described manner.

TABLE 4

| No. | Positive electrode active material | % | Solid electrolyte | % | Binder particles | % | Dispersion medium | Note |
|---|---|---|---|---|---|---|---|---|
| U-1 | NMC | 70 | LPS | 27 | B-1 | 3 | Heptane | Present Invention |
| U-2 | LCO | 70 | LPS | 27 | B-1 | 3 | Heptane | Present Invention |
| U-3 | NMC | 68 | LPS | 26 | B-1 | 6 | Heptane | Present Invention |
| U-4 | NMC | 70 | LPS | 27 | B-3 | 3 | Heptane | Present Invention |
| U-5 | NMC | 70 | LPS | 27 | B-4 | 3 | Heptane | Present Invention |
| U-6 | NMC | 70 | LPS | 27 | B-5 | 3 | Heptane | Present Invention |
| U-7 | NMC | 70 | LPS | 27 | B-6 | 3 | Heptane | Present Invention |
| U-8 | NMC | 70 | LPS | 27 | B-7 | 3 | Heptane | Present Invention |
| U-9 | NMC | 70 | LPS | 27 | B-8 | 3 | Heptane | Present Invention |
| U-10 | NMC | 70 | LPS | 27 | B-10 | 3 | Heptane | Present Invention |
| U-11 | NMC | 70 | LPS | 27 | B-11 | 3 | Heptane | Present Invention |
| U-12 | NMC | 70 | LPS | 27 | B-12 | 3 | Heptane | Present Invention |
| U-13 | NMC | 70 | LPS | 27 | B-13 | 3 | Heptane | Present Invention |
| U-14 | NMC | 70 | LPS | 27 | B-14 | 3 | Heptane | Present Invention |
| V-1 | NMC | 70 | LPS | 27 | BC-1 | 3 | Toluene | Comparative Example |
| V-2 | NMC | 70 | LPS | 27 | BC-2 | 3 | Acetonitrile | Comparative Example |
| V-3 | NMC | 70 | LPS | 27 | BC-3 | 3 | Heptane | Comparative Example |
| V-4 | NMC | 70 | LPS | 27 | BC-4 | 3 | Heptane | Comparative Example |

<Notes of Table>
Content: Mass-based
NMC; $Li(Ni_{1/3}Mn_{1/3}Co_{1/3})O_2$ Lithium nickel manganese cobalt oxide (Nippon Chemical Industrial Co., Ltd.)
LCO; $LiCoO_2$ Lithium cobalt oxide <Production of Positive Electrode Sheet for All-Solid State Secondary Battery>

Each of the composition for a positive electrode layer was applied onto a 20 μm-thick aluminum foil using the Baker type applicator as shown in Table 5 and heated at 80° C. for two hours, thereby drying the composition for a positive electrode layer. After that, the dried composition for a positive electrode layer was heated (at 120° C.) and pressurized (600 MPa for one minute) using a heat pressing machine, thereby producing a positive electrode sheet for an all-solid state secondary battery having an 80 μm-thick positive electrode active material layer.

Next, each of the solid electrolyte compositions produced in Example 1 (Table 5) was applied on the positive electrode active material layer of the positive electrode sheet for an all-solid state secondary battery using the Baker type applicator and heated at 80° C. for two hours, thereby drying solid electrolyte composition. After that, the dried solid electrolyte composition was heated (at 120° C.) and pressurized (600 MPa for one minute) using a heat pressing machine, thereby producing a positive electrode sheet for an all-solid state secondary battery including a 30 μm-thick solid electrolyte layer.

<Production of All-Solid State Secondary Battery>

A disc-shaped piece having a diameter of 14.5 mm was cut out from the positive electrode sheet for an all-solid state secondary battery obtained above, was put into a 2032-type stainless steel coin case 11 into which a spacer and a washer were combined, and an indium foil cut out to a diameter of 15 mm was overlaid on the solid electrolyte layer. A stainless steel foil was further overlaid on the indium foil, and the coin case 11 was swaged, thereby producing all-solid state secondary batteries Nos. 201 to 214 and c21 to c24 illustrated in FIG. 2.

The layer constitution of the all-solid state secondary battery manufactured as described above is the layer constitution illustrated in FIG. 1.

<Evaluation of Resistance>

Each of the all-solid state secondary batteries produced above was evaluated using a charge and discharge evaluation device TOSCAT-3000 (trade name, manufactured by Toyo System Corporation). The all-solid state secondary battery was charged at a current density of 0.1 mA/cm² until the battery voltage reached 3.6 V. The all-solid state secondary battery was discharged at a current density of 0.1 mA/cm² until the battery voltage reached 1.9 V. The charging and discharge were repeated, the battery voltage after three cycles of 5 mAh/g (the quantity of electricity per gram of the mass of the active material) discharging was scanned using the following standards, and the resistance was evaluated. A high battery voltage indicates a low resistance. In the present test, the evaluation standards of "C" or higher are pass.

Evaluation Standards
A: 3.3 V or higher
B: 3.1 V or higher and lower than 3.3 V
C: 2.9 V or higher and less than 3.1 V
D: Lower than 2.9 V
E: Charging and discharging was not possible.

<Evaluation of Discharge Capacity Retention>

Each of the all-solid state secondary batteries produced above was evaluated using a charge and discharge evaluation device TOSCAT-3000. The all-solid state secondary battery was charged at a current density of 0.1 mA/cm² until the battery voltage reached 3.6 V. The all-solid state secondary battery was discharged at a current density of 0.1 mA/cm² until the battery voltage reached 1.9 V. Three cycles of charging and discharging were repeated under the above-described conditions, thereby carrying out initialization.

Each of the initialized all-solid state secondary batteries was charged at a current density of 0.2 mA/cm² until the battery voltage reached 4.2 V and then discharged at a current density of 0.2 mA/cm² until the battery voltage reached 2.5 V. The above-described charging and discharging was considered as one cycle, and the charging and discharging was repeated.

The discharge capacity at the first cycle of this charging and discharging after the initialization was considered as 100%, and the number of cycles repeated until the discharge capacity retention reached 80% was evaluated using the following standards. In the present test, the evaluation standards of "C" or higher are pass.

Evaluation Standards

A: 200 cycles or more

B: 100 cycles or more and less than 200 cycles

C: 50 cycles or more and less than 100 cycles

D: Less than 50 cycles

E: Charging and discharging was not possible.

TABLE 5

| | Layer constitution | | | | |
|---|---|---|---|---|---|
| No. | Positive electrode layer | Solid electrolyte layer | Resistance | Discharge capacity retention | Note |
| 201 | U-1 | S-1 | A | B | Present Invention |
| 202 | U-2 | S-1 | A | B | Present Invention |
| 203 | U-3 | S-1 | B | A | Present Invention |
| 204 | U-4 | S-5 | C | B | Present Invention |
| 205 | U-5 | S-6 | B | B | Present Invention |
| 206 | U-6 | S-7 | A | B | Present Invention |
| 207 | U-7 | S-8 | C | B | Present Invention |
| 208 | U-8 | S-9 | A | A | Present Invention |
| 209 | U-9 | S-10 | A | A | Present Invention |
| 210 | U-10 | S-12 | A | A | Present Invention |
| 211 | U-11 | S-13 | A | A | Present Invention |
| 212 | U-12 | S-14 | A | C | Present Invention |
| 213 | U-13 | S-15 | C | A | Present Invention |
| 214 | U-14 | S-16 | B | C | Present Invention |
| c21 | V-1 | T-1 | D | E | Comparative Example |
| c22 | V-2 | T-2 | E | E | Comparative Example |
| c23 | V-3 | T-3 | C | D | Comparative Example |
| c24 | V-4 | T-4 | D | C | Comparative Example |

The results of Table 5 show that, in the all-solid state secondary batteries having a positive electrode active material layer and a solid electrolyte layer formed using the solid electrolyte composition of the present invention including the binder particles encompassing the ion-conductive substance, the inorganic solid electrolyte, and the dispersion medium, the resistance was small, and furthermore, the cycle characteristics were also excellent. As described above, the use of the solid electrolyte composition of the present invention enabled the manufacturing of an all-solid state secondary battery in which the resistance (the interface resistance between solid particles) was small (the ion conductivity was high) and, furthermore, the discharge capacity retention was also high (the bonding property was also favorable).

In contrast, in the all-solid state secondary battery having the positive electrode active material layer and the solid electrolyte layer formed using the solid electrolyte composition T-1 or T-2 (Nos. c21 and c22 correspond to the inventions of WO2012/173089A and JP2004-186089A) which was for the comparison with the solid electrolyte composition containing the binding agent (binder particles) consisting of a polymer, neither the resistance nor the cycle characteristics were sufficient. In addition, in the all-solid state secondary battery having the positive electrode active material layer and the solid electrolyte layer formed using the solid electrolyte composition T-3 (No. c23 corresponds to the inventions of JP2015-88486A), the resistance was small, but the cycle characteristics were not sufficient. Furthermore, in the all-solid state secondary battery having the positive electrode active material layer and the solid electrolyte layer formed using the solid electrolyte composition T-4 (No. c24) which was for the comparison with the solid electrolyte composition containing the binding agent (binder particles) not encompassing the ion-conductive substance, the resistance was great, and the ion conductivity was not sufficient.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

The present application claims priority on the basis of JP2015-241754 filed on Dec. 11, 2015 in Japan, the content of which is incorporated herein by reference.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: coin case
12: sheet for all-solid state secondary battery
13: cell for measuring ion conductivity (coin battery)

What is claimed is:

1. An all-solid state secondary battery comprising:
a positive electrode active material layer;
a solid electrolyte layer; and
a negative electrode active material layer in this order,
wherein at least one of the positive electrode active material layer, the solid electrolyte layer, and the negative electrode active material layer is a layer including an inorganic solid electrolyte having conductivity for ions of metal elements belonging to Group I or II of the periodic table and binder particles which have an average particle diameter of 10 nm or more and 50,000 nm or less and encompass an ion-conductive substance,
wherein the binder particles are formed of the ion-conductive substance and a polymer, and the ion-conductive substance is coated with the polymer having a mass ratio of 30% or more and 100% or less of the ion-conductive substance.

2. The all-solid state secondary batter according to claim 1,
wherein the ion-conductive substance is an inorganic solid electrolyte or a liquid electrolyte.

3. The all-solid state secondary battery according to claim 1,
wherein the ion-conductive substance is an inorganic solid electrolyte or a liquid electrolyte including a liquid having a boiling point of 100° C. or higher or an ionic liquid and a Li salt.

4. The all-solid state secondary battery according to claim 1,
wherein a polymer forming the binder particles is a polyamide, a polyimide, a polyurea, a urethane resin, or an acrylic resin.

5. The all-solid state secondary battery according to claim 1,
wherein a polymer forming the binder particles has a repeating unit derived from a monomer having an SP value of 11 (cal$^{1/2}$ cm$^{-3/2}$) or more or a partial structure derived from a condensation component having an SP value of 11 (cal$^{1/2}$ cm$^{-3/2}$) or more.

6. The all-solid state secondary battery according to claim 5,
wherein a content of the repeating unit or the partial structure in the polymer is 10% by mass or more.

7. The all-solid state secondary battery according to claim 1,
wherein a mass ratio between the ion-conductive substance and a polymer forming the binder particles is 1:1 to 10.

8. The all-solid state secondary battery according to claim 1,
wherein the inorganic solid electrolyte is represented by Formula (1), $$L_{a1}M_{b1}P_{c1}S_{d1}A_{e1} \qquad (1)$$

in the formula, L represents an element selected from Li, Na, and K, M represents an element selected from B, Zn, Sn, Si, Cu, Ga, Sb, Al, and Ge, A represents I, Br, Cl, or F, a1 to e1 represent the compositional ratios among the respective elements, and a1:b1:c1:d1:e1 satisfies 1 to 12:0 to 5:1:2 to 12:0 to 10.

9. The all-solid state secondary battery according to claim 7,
wherein the mass ratio between the ion-conductive substance and the polymer forming the binder particles is 1:1.5 to 8.

10. The all-solid state secondary battery according to claim 1,
wherein the solid electrolyte composition further comprises a dispersion medium, and
wherein the mass ratio between the ion-conductive substance and the polymer forming the binder particles is 1:1.5 to 8.

* * * * *